(12) United States Patent
Kuang et al.

(10) Patent No.: US 11,044,740 B2
(45) Date of Patent: Jun. 22, 2021

(54) ROUTE UPDATE METHOD, SCHEDULING REQUEST CANCELLATION METHOD, AND DEVICE

(71) Applicant: Huawei Technologies Co., Ltd., Shenzhen (CN)

(72) Inventors: Yiru Kuang, Beijing (CN); Nathan Edward Tenny, San Diego, CA (US); Jian Wang, Beijing (CN); Chuting Yao, Beijing (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/700,625

(22) Filed: Dec. 2, 2019

(65) Prior Publication Data

US 2020/0107342 A1   Apr. 2, 2020

Related U.S. Application Data

(63) Continuation of application No. PCT/CN2019/074864, filed on Feb. 12, 2019.

(30) Foreign Application Priority Data

Feb. 13, 2018 (CN) .......................... 201810150653.6

(51) Int. Cl.
   *H04W 72/12* (2009.01)
   *H04W 28/02* (2009.01)
   (Continued)

(52) U.S. Cl.
   CPC ... *H04W 72/1263* (2013.01); *H04W 28/0278* (2013.01); *H04W 28/065* (2013.01); *H04W 72/14* (2013.01); *H04W 80/02* (2013.01)

(58) Field of Classification Search
   CPC combination set(s) only.
   See application file for complete search history.

(56) References Cited

U.S. PATENT DOCUMENTS

| 9,967,898 B2 * | 5/2018 | Li ..................... H04W 72/1247 |
| 10,368,265 B2 * | 7/2019 | Zhang ............... H04W 28/0278 |

(Continued)

FOREIGN PATENT DOCUMENTS

| CN | 101778418 A | 7/2010 |
| CN | 102088752 A | 6/2011 |

(Continued)

OTHER PUBLICATIONS

"SR cancel issue," 3GPP TSG-RAN2 NR AH-1801,Vancouver, Canada, R2-1801810, pp. 1-2, 3rd Generation Partnership Project, Valbonne, France (Jan. 22-26, 2018).

(Continued)

*Primary Examiner* — Xavier S Wong
(74) *Attorney, Agent, or Firm* — Leydig, Voit & Mayer, Ltd.

(57) ABSTRACT

A route update method relating to a communications field includes: sending a medium access control protocol data unit (MAC PDU), wherein the MAC PDU comprises a first buffer status report (BSR); and canceling, in response to the sending of the MAC PDU, a scheduling request triggered prior to the MAC PDU assembly. The first BSR comprises a buffer status up to the last event that triggers a BSR prior to the MAC PDU assembly.

17 Claims, 13 Drawing Sheets

(51) Int. Cl.
*H04W 28/06* (2009.01)
*H04W 72/14* (2009.01)
*H04W 80/02* (2009.01)

(56) References Cited

U.S. PATENT DOCUMENTS

| | | | |
|---|---|---|---|
| 2011/0059745 A1* | 3/2011 | Yi et al. | |
| 2011/0255492 A1 | 10/2011 | Dai et al. | |
| 2012/0294270 A1* | 11/2012 | Yamada | H04W 74/02 370/329 |
| 2012/0307767 A1* | 12/2012 | Yamada et al. | |
| 2013/0070700 A1 | 3/2013 | Chang | |
| 2015/0003371 A1* | 1/2015 | Park | H04W 52/0238 370/329 |
| 2015/0063278 A1* | 3/2015 | Ostergaard | H04W 72/1284 370/329 |
| 2016/0128094 A1* | 5/2016 | Lee | H04W 72/14 370/329 |
| 2017/0093541 A1* | 3/2017 | Pan | H04W 76/14 |
| 2019/0191464 A1* | 6/2019 | Loehr | H04W 74/0833 |

FOREIGN PATENT DOCUMENTS

| | | |
|---|---|---|
| CN | 102726113 A | 10/2012 |
| CN | 105722172 A | 6/2016 |
| CN | 107079469 A | 8/2017 |
| EP | 2487981 A2 | 8/2012 |
| RU | 2516385 C2 | 5/2014 |
| WO | 2018232259 A1 | 12/2018 |

OTHER PUBLICATIONS

"New SID Proposal: Study on Integrated Access and Backhaul for NR," 8881123GPP TSG RAN Meeting #75, Dubrovnik, Croatia, RP-170821, pp. 1-5, 3rd Generation Partnership Project, Valbonne, France (Mar. 6-9, 2017).

"3rd Generation Partnership Project;Technical Specification Group Radio Access Network; NR; Medium Access Control (MAC) protocol specification (Release 15)," 3GPP TS 38.321 V15.0.0, pp. 1-55, 3rd Generation Partnership Project, Valbonne, France (Dec. 2017).

"Accurate SR trigger in BSR procedure," 3GPP TSG-RAN WG2 NR AH-1801, Vancouver, Canada, R2-1800164, total 4 pages, 3rd Generation Partnership Project, Valbonne, France (Jan. 27- 26, 2018).

"Clarification on "new immediate transmission" for BSR," 3GPP TSR-RAN WG2 NR Ad hoc 1801, Vancouver, Canada R2-1800582, total 2 pages, 3rd Generation Partnership Project, Valbonne, France (Jan. 22 - 26, 2018).

"Conditions for BSR MAC CE generation and clearing of triggered BSR(s)," 3GPP TSG-RAN WG2 NR Ad hoc 1801, Vancouver, Canada, R2-1800814,total 4 pages, 3rd Generation Partnership Project, Valbonne, France (Jan. 22-26, 2018).

RU/2020129965, Office Action, dated Mar. 1, 2021.

\* cited by examiner

ROUTE UPDATE METHOD, SCHEDULING REQUEST CANCELLATION METHOD, AND DEVICE

CROSS-REFERENCE TO RELATED APPLICATIONS

This application is a continuation of International Application No. PCT/CN2019/074864, filed on Feb. 12, 2019, which claims priority to Chinese Patent Application No. 201810150653.6, filed on Feb. 13, 2018.

TECHNICAL FIELD

Embodiments of this application relate to the field of communications technologies, and in particular, to a route update method and a device.

BACKGROUND

In a tree network topology, a user equipment (UE) may directly communicate with a donor base station (Donor gNB, DgNB), or may communicate with a donor base station by using a relay node (RN). To be specific, a path from the UE to the donor base station may include a plurality of RNs. The donor base station and the RN both store routing information, where the routing information includes information about a path from a local end to the UE. The donor base station and the RN may send data packets to a correct UE based on the routing information.

When an RN switches, for example, when the RN switches from a currently connected RN to another RN, the network topology changes. Therefore, the donor base station and each RN in the network topology need to update the locally stored routing information based on a changed network topology. On one hand, when an RN 1 switches from an RN 2 to an RN 3, the RN 2 discovers that the RN 1 leaves. In this case, the RN 2 sends a message to a parent node RN 4 of the RN 2 to indicate "the RN 1 leaves the RN 2". The RN 4 updates routing information of the RN 4 based on the message, and continues to send a message to a parent node RN 5 of the RN 4 to indicate "the RN 1 leaves the RN 2", until the message reaches the donor base station. The donor base station updates the routing information of the donor base station based on the message. The parent node may be a donor base station or a relay node. It should be noted that, a parent node of a node may be understood as an upstream node directly connected to the node, that is, may be understood as a previous hop directly connected to the node.

On the other hand, when the RN 3 discovers that the RN 1 accesses the RN 3, the RN 3 sends a message to a parent node RN 6 of the RN 3 to indicate "the RN 1 joins the RN 3". The RN 6 updates routing information of the RN 6 based on the message, and continues to send a message to a parent node RN 7 of the RN 6 to indicate "the RN 1 joins the RN 3", until the message reaches the donor base station. The donor base station further updates routing information of the donor base station based on the message.

In the prior art, when the network topology changes due to switching of an RN, each RN in a path, from the RN before switching, to the donor base station updates routing information. In addition, all RNs in the path, from the RN after switching, to the donor base station also update routing information. Actually, the change of the network topology does not affect routing information of some RNs and the donor base station. To be specific, updated routing information is the same as routing information before the update. Therefore, the RNs and the donor base station do not need to update the routing information. In addition, the RNs indicate the change (for example, an RN leaves an RN, or an RN joins an RN) of the network topology by using specific messages. Therefore, unnecessary signaling overheads are also caused.

After the network topology changes, the donor base station can resend a data packet from the new path only after the donor base station and all the RNs update the routing information. Therefore, a relatively long data interruption time is caused.

SUMMARY

Embodiments of this application provide a route update method and a device, to reduce signaling overheads and reduce a data interruption time caused by a network topology change.

To achieve the foregoing objective, embodiments of this application include the following technical solutions:

According to a first aspect, an embodiment of this application provides a route update method, including: receiving, by a first node, a first message sent by a second node. Specifically, the first message is used to indicate that a switching node leaves a source node and/or that a switching node accesses a target node. The source node is a node to which the switching node before switching is connected, and the target node is a node to which the switching node after switching is connected. Further, the first node may further update routing information of the first node based on the received first message, for example, delete a next hop to a node, or add a next hop to a node.

In an exemplary implementation, the first node is any one of the following nodes: the target node, the source node, a core node, a first relay node between the target node and the core node, and a second relay node between the source node and the core node. The core node is a first common upstream node for the target node and the source node. The second node is any one of the following nodes: the switching node, the target node, the source node, the core node, the first relay node, and the second relay node.

It can be seen that, in the method provided by this embodiment of the present application, when a network topology changes due to switching of a node, only the core node and a downstream node of the core node exchange messages to indicate node switching and update routes. In the prior art, after switching of a node in an integrated access and backhaul (IAB) network, each node in a path to a donor base station from the node before switching receives a message for indicating node switching, and also updates routing information. In addition, each node in a path to the donor base station from the node after switching also receives a message for indicating node switching, and updates routing information. In comparison, in this embodiment of the present application, other nodes than the core node and the downstream node of the core node in an IAB network do not need to update routes, and the nodes do not need to be notified by using signaling either. This reduces signaling overheads. In addition, because a quantity of nodes that update routes is reduced, communication of the entire network can be recovered within a relatively short time, and a data interruption time is shortened.

With reference to the first aspect, in a first possible implementation of the first aspect, the method further includes: determining, by the first node based on the first message, a third node that is to receive a second message, and sending the second message to the third node, where the second message is used to indicate that the switching node leaves the source node and/or that the switching node accesses the target node, where the third node is any one of the following nodes: the source node, the core node, the target node, the first relay node, and the second relay node.

To be specific, the first node further sends a message to another node to indicate node switching, so that the core node related to the switching node in the IAB network and the downstream node of the core node can both receive the messages for indicating node switching. After the network topology changes, the core node and the downstream node of the core node update their routing information based on an actual change of the network topology, and forward data based on correct routing information, so that communication of the network is recovered.

With reference to the first possible implementation of the first aspect, in a second possible implementation of the first aspect, the second message further includes routing information of the switching node.

In some embodiments, if other lower-level nodes are further connected to the switching node, and the nodes switch together with the switching node, the routing information of the switching node includes routing information related to the lower-level nodes. To ensure that a donor base station can continue to communicate with the lower-level nodes subsequently, the routing information of the switching node needs to be indicated by using the second message. Therefore, each node may further update the routing information related to the lower-level nodes, to ensure that data subsequently sent by the donor base station can reach the lower-level nodes, or that data subsequently sent by the lower-level nodes can reach the donor base station.

With reference to the first aspect, or the first or the second possible implementation of the first aspect, in a third possible implementation of the first aspect, the first message further includes the routing information of the switching node.

In some embodiments, if other lower-level nodes are further connected to the switching node, and the nodes switch together with the switching node, the routing information of the switching node includes routing information related to the lower-level nodes. To ensure that the donor base station can continue to communicate with the lower-level nodes subsequently, the routing information of the switching node needs to be indicated by using the first message. Therefore, each node may further update the routing information related to the lower-level nodes, to ensure that data subsequently sent by the donor base station can reach the lower-level nodes, or that data subsequently sent by the lower-level nodes can reach the donor base station.

With reference to the first possible implementation of the first aspect, in a fourth possible implementation of the first aspect, the determining, by the first node based on the first message, a third node that is to receive a second message includes: if determining that the routing information of the first node does not include information about the switching node and/or that the routing information of the first node does not include information about the source node, determining, by the first node, that the third node is a parent node of the first node.

In some embodiments, nodes that need to add routing information first update routes, and after the nodes add the routing information, nodes that need to delete routing information update their routing information. Therefore, the switching node sends the first message to the target node to indicate node switching. Then the target node may transfer the message to upstream first relay nodes of the target node. Each first relay node needs to send, after receiving a message sent by a child node, the message to a parent node of the first relay node, so that a downstream node of the core node in a path in which the switching node after switching is located has updated a route. For the first node, if the routing information of the first node does not include the information about the switching node, or the routing information of the first node does not include the information about the switching node and the source node, or the routing information of the first node does not include the information about the source node, it indicates that the node is a node in a path in which the switching node after switching is located. For example, the node may be the first relay node or the target node.

With reference to the fourth possible implementation of the first aspect, in a fifth possible implementation of the first aspect, the first message is used to indicate that the switching node leaves the source node and that the switching node accesses the target node, and the second message is used to indicate that the switching node leaves the source node and that the switching node accesses the target node; or the first message is used to indicate that the switching node accesses the target node, and the second message is used to indicate that the switching node accesses the target node.

To be specific, for the first relay node or the target node, content indicated by the received message needs to be transferred, that is, the content indicated by the first message may be the same as that indicated by the second message.

With reference to the first possible implementation of the first aspect, in a sixth possible implementation of the first aspect, the determining, by the first node based on the first message, a third node that is to receive a second message includes: if determining that the routing information of the first node includes information about the switching node and/or that the routing information of the first node includes information about the source node, determining, by the first node, that the third node is a child node of the first node.

For the first node, if the routing information of the first node includes the information about the switching node, or the routing information of the first node includes the information about the switching node and the source node, or the routing information of the first node includes the information about the source node, it indicates whether the node is a node in a path in which the switching node after switching is located or a node in a path in which the switching node before switching is located. For example, the node may be a first common node in two paths in a direction that approaches a UE, that is, the core node in this embodiment of the present application. In addition, in this embodiment of the present application, other nodes than the core node and the downstream node of the core node in the IAB network do not need to update routes, the nodes do not need to be notified by using signaling either, and nodes in the path in which the switching node after switching is located, for example, the first relay node and the target node, have updated routes. Therefore, the core node needs to send a message to a child node of the core node to indicate leaving of the switching node.

With reference to the sixth possible implementation of the first aspect, in a seventh possible implementation of the first aspect, the first message is used to indicate that the switching node leaves the source node and that the switching node accesses the target node, and the second message is used to indicate that the switching node leaves the source node; or the first message is used to indicate that the switching node accesses the target node, and the second message is used to indicate that the switching node leaves the source node; or the first message is used to indicate that the switching node leaves the source node and that the switching node accesses the target node, and the second message is used to indicate that the switching node leaves; or the first message is used to indicate that the switching node accesses the target node, and the second message is used to indicate that the switching node leaves.

In an exemplary implementation, the core node may indicate, to the child node (for example, the second relay node) of the core node, that the switching node leaves the source node, or may only indicate that the switching node leaves; and after the message indicated by the core node is received, a route may be updated based on content indicated by the core node, for example, "a next hop to the switching node" in routing information is deleted.

With reference to the first possible implementation of the first aspect, in an eighth possible implementation of the first aspect, the determining, by the first node based on the first message, a third node that is to receive a second message includes: if determining that the routing information of the first node includes information about the switching node and that the switching node before switching is not a child node of the first node, determining, by the first node, that the third node is a child node of the first node.

If the first node determines that the routing information of the first node includes the information about the switching node, it indicates that the node is in a path in which the switching node before switching is located. Because the switching node before switching is not a child node of the first node, it indicates that the switching node is not the source node. For example, the node is the second relay node. In this embodiment of the present application, the core node and the downstream node of the core node update routes. Therefore, the second relay node sends the second message to a child node of the second relay node to indicate node switching.

With reference to the eighth possible implementation of the first aspect, in a ninth possible implementation of the first aspect, the first message is used to indicate that the switching node leaves, and the second message is used to indicate that the switching node leaves.

To be specific, the first node is the second relay node. The message received by the second relay node indicates that the switching node leaves, and the message sent by the second relay node to a node of the second relay node indicates that the switching node leaves.

With reference to any one of the sixth to the ninth possible implementations of the first aspect, in a tenth possible implementation of the first aspect, the determining that the third node is a child node of the first node includes: determining, by the first node based on the routing information of the first node, that a next hop to the switching node is the third node.

To be specific, the first node is the second relay node. The message received by the second relay node indicates that the switching node leaves, and the message may carry the information about the switching node. Therefore, the second relay node may determine, based on the information about the switching node and routing information of the second relay node, to which node the message for indicating switching is to be sent.

With reference to the first possible implementation of the first aspect, in an eleventh possible implementation of the first aspect, the determining, by the first node based on the first message, a third node that is to receive a second message includes: if determining that information about the source node is different from information about the first node, determining, by the first node, that the third node is a child node of the first node; and/or if determining that the routing information of the first node includes information about the switching node and that the switching node before switching is not a child node of the first node, determining, by the first node, that the third node is a child node of the first node.

If the first node determines that the information about the source node is different from the information about the first node, it indicates that the node is not the source node; or if the first node determines that the routing information of the first node includes the information about the switching node, it indicates that the node is in a path in which the switching node before switching is located. Because the switching node before switching is not a child node of the first node, it indicates that the node is not the source node. For example, the node is the second relay node. In this embodiment of the present application, the core node and the downstream node of the core node update routes. Therefore, the second relay node sends the second message to a child node of the second relay node to indicate node switching.

With reference to the eleventh possible implementation of the first aspect, in a twelfth possible implementation of the first aspect, the first message is used to indicate that the switching node leaves the source node, and the second message is used to indicate that the switching node leaves the source node.

Specifically, the first message may carry the information about the switching node and the information about the source node, and the second message may carry the information about the switching node and the information about the source node.

With reference to the eleventh or the twelfth possible implementation of the first aspect, in a thirteenth possible implementation of the first aspect, the determining that the third node is a child node of the first node includes: determining, by the first node based on the routing information of the first node, that a next hop to the source node is the third node; and/or determining, by the first node based on the routing information of the first node, that a next hop to the switching node is the third node.

To be specific, the first node is the second relay node. The message received by the second relay node indicates that the switching node leaves the source node, and the message may carry the information about the switching node and the information about the source node. Therefore, the second relay node may determine, based on the information about the switching node or the information about the source node and routing information of the second relay node, to which node the message for indicating switching is to be sent.

With reference to the first possible implementation of the first aspect, in a fourteenth possible implementation of the first aspect, the determining, by the first node based on the first message, a third node that is to receive a second message includes: if determining that the routing information of the first node does not include information about the target node, determining, by the first node, that the third node is a parent node of the first node.

In some embodiments, nodes that need to delete routing information first update routes, and after the nodes delete the routing information, nodes that need to add routing information update their routing information. Therefore, the switching node sends the first message to the source node to indicate node switching. Then the source node may transfer the message to upstream second relay nodes of the source node. Each second relay node needs to send, after receiving a message sent by a child node, the message to a parent node of the second relay node to indicate node switching, so that a downstream node of the core node in a path in which the switching node before switching is located has updated a route. If routing information of a node does not include an identifier of the target, it indicates that the node is a node in the path in which the switching node before switching is located. For example, the node may be the second relay node or the source node.

With reference to the fourteenth possible implementation of the first aspect, in a fifteenth possible implementation of the first aspect, the first message is used to indicate that the switching node leaves the source node and that the switching node accesses the target node, and the second message is used to indicate that the switching node leaves the source node and that the switching node accesses the target node; or the first message is used to indicate that the switching node accesses the target node, and the second message is used to indicate that the switching node accesses the target node.

To be specific, for the second relay node or the target node, content indicated by the received message needs to be transferred, that is, the content indicated by the first message may be the same as that indicated by the second message.

With reference to the first possible implementation of the first aspect, in a sixteenth possible implementation of the first aspect, the determining, by the first node based on the first message, a third node that is to receive a second message includes: if determining that the routing information of the first node includes information about the target node, determining, by the first node, that the third node is a child node of the first node.

If routing information of a node includes the information about the target node, it indicates that the node is a node in a path in which the switching node after switching is located. Because routing information of a child node of the node does not include the information about the target node, it indicates that the node is still a node in a path in which the switching node before switching is located. For example, the node may be a first common node in two paths in a direction that approaches a UE, that is, the core node in this embodiment of the present application. In addition, in this embodiment of the present application, other nodes than the core node and the downstream node of the core node in the IAB network do not need to update routes, the nodes do not need to be notified by using signaling either, and nodes in the path in which the switching node after switching is located, for example, the first relay node and the target node, have updated routes. Therefore, the core node needs to send a message to a child node of the core node to indicate joining of the switching node.

With reference to the sixteenth possible implementation of the first aspect, in a seventeenth possible implementation of the first aspect, the first message is used to indicate that the switching node leaves the source node and that the switching node accesses the target node, and the second message is used to indicate that the switching node accesses the target node; or the first message is used to indicate that the switching node accesses the target node, and the second message is used to indicate that the switching node accesses the target node.

For the second relay node, the received first message may be different from the second message sent to the child node thereof, and the sent second message is used to indicate that the switching node accesses the target node.

With reference to the first possible implementation of the first aspect, in an eighteenth possible implementation of the first aspect, the determining, by the first node based on the first message, a third node that is to receive a second message includes: if determining that information about the target node is different from information about the first node, determining, by the first node, that the third node is a child node of the first node.

For the first relay node, if the first relay node is not the target node, the first relay node needs to send the second message to a node of the first relay node to indicate joining of the switching node.

With reference to the eighteenth possible implementation of the first aspect, in a nineteenth possible implementation of the first aspect, the first message is used to indicate that the switching node accesses the target node, and the second message is used to indicate that the switching node accesses the target node.

With reference to any one of the sixteenth to the nineteenth possible implementations of the first aspect, in a twentieth possible implementation of the first aspect, the determining that the third node is a child node of the first node includes: determining, by the first node based on the routing information of the first node, that a next hop to the target node is the third node.

When the first node is the first relay node, and the message received by the first relay node includes the information about the target node, the second relay node may determine, based on the information about the target node, how to send a message to indicate node switching.

According to a second aspect, a device is disclosed, where the device is used as a first node and includes: a receiving unit, configured to receive a first message sent by a second node, where the first message is used to indicate that a switching node leaves a source node and/or that a switching node accesses a target node, the source node is a node to which the switching node before switching is connected, and the target node is a node to which the switching node after switching is connected; and an updating unit, configured to update routing information of the first node based on the first message.

In an exemplary implementation, the first node is any one of the following nodes: the target node, the source node, a core node, a first relay node between the target node and the core node, and a second relay node between the source node and the core node, where the core node is a first common upstream node for the target node and the source node; and the second node is any one of the following nodes: the switching node, the target node, the source node, the core node, the first relay node, and the second relay node.

It can be seen that, when a network topology changes due to switching of a node, only the core node and a downstream node of the core node exchange messages to indicate node switching and update routes. In the prior art, after switching of a node in an IAB network, each node in a path to a donor base station from the node before switching receives a message for indicating node switching, and also updates routing information. In addition, each node in a path to the donor base station from the node after switching also receives a message for indicating node switching, and updates routing information. In comparison, in this embodiment of the present application, other nodes than the core node and the downstream node of the core node in an IAB network do not need to update routes, and the nodes do not need to be notified by using signaling either. This reduces signaling overheads. In addition, because a quantity of nodes that update routes is reduced, communication of the entire network can be recovered within a relatively short time, and a data interruption time is shortened.

With reference to the second aspect, in a first possible implementation of the second aspect, the device further includes a determining unit, where the determining unit is configured to determine, based on the first message, a third node that is to receive a second message, and send the second message to the third node, where the second message is used to indicate that the switching node leaves the source node and/or that the switching node accesses the target node, where the third node is any one of the following nodes: the source node, the core node, the target node, the first relay node, and the second relay node.

With reference to the first possible implementation of the second aspect, in a second possible implementation of the second aspect, the second message further includes routing information of the switching node.

With reference to the second aspect, or the first or the second possible implementation of the second aspect, in a third possible implementation of the second aspect, the first message further includes the routing information of the switching node.

With reference to the first possible implementation of the second aspect, in a fourth possible implementation of the second aspect, the determining unit is configured to: if determining that the routing information of the first node does not include information about the switching node and/or that the routing information of the first node does not include information about the source node, determine that the third node is a parent node of the first node.

With reference to the fourth possible implementation of the second aspect, in a fifth possible implementation of the second aspect, the first message is used to indicate that the switching node leaves the source node and that the switching node accesses the target node, and the second message is used to indicate that the switching node leaves the source node and that the switching node accesses the target node; or the first message is used to indicate that the switching node accesses the target node, and the second message is used to indicate that the switching node accesses the target node.

With reference to the first possible implementation of the second aspect, in a sixth possible implementation of the second aspect, the determining unit is configured to: if determining that the routing information of the first node includes information about the switching node and/or that the routing information of the first node includes information about the source node, determine that the third node is a child node of the first node.

With reference to the sixth possible implementation of the second aspect, in a seventh possible implementation of the second aspect, the first message is used to indicate that the switching node leaves the source node and that the switching node accesses the target node, and the second message is used to indicate that the switching node leaves the source node; or the first message is used to indicate that the switching node accesses the target node, and the second message is used to indicate that the switching node leaves the source node; or the first message is used to indicate that the switching node leaves the source node and that the switching node accesses the target node, and the second message is used to indicate that the switching node leaves; or the first message is used to indicate that the switching node accesses the target node, and the second message is used to indicate that the switching node leaves.

With reference to the first possible implementation of the second aspect, in an eighth possible implementation of the second aspect, the determining unit is configured to: if determining that the routing information of the first node includes information about the switching node and that the switching node before switching is not a child node of the first node, determine that the third node is a child node of the first node.

With reference to the eighth possible implementation of the second aspect, in a ninth possible implementation of the second aspect, the first message is used to indicate that the switching node leaves, and the second message is used to indicate that the switching node leaves.

With reference to the sixth or the seventh or the eighth or the ninth possible implementation of the second aspect, in a tenth possible implementation of the second aspect, the determining unit is configured to determine, based on the routing information of the first node, that a next hop to the switching node is the third node.

With reference to the first possible implementation of the second aspect, in an eleventh possible implementation of the second aspect, the determining unit is configured to: if determining that information about the source node is different from information about the first node, determine that the third node is a child node of the first node; and/or if determining that the routing information of the first node includes information about the switching node and that the switching node before switching is not a child node of the first node, determine that the third node is a child node of the first node.

With reference to the eleventh possible implementation of the second aspect, in a twelfth possible implementation of the second aspect, the first message is used to indicate that the switching node leaves the source node, and the second message is used to indicate that the switching node leaves the source node.

With reference to the eleventh or the twelfth possible implementation of the second aspect, in a thirteenth possible implementation of the second aspect, the determining unit is configured to: determine, based on the routing information of the first node, that a next hop to the source node is the third node; and/or determine, based on the routing information of the first node, that a next hop to the switching node is the third node.

With reference to the first possible implementation of the second aspect, in a fourteenth possible implementation of the second aspect, the determining unit is configured to: if determining that the routing information of the first node does not include information about the target node, determine that the third node is a parent node of the first node.

With reference to the fourteenth possible implementation of the second aspect, in a fifteenth possible implementation of the second aspect, the first message is used to indicate that the switching node leaves the source node and that the switching node accesses the target node, and the second message is used to indicate that the switching node leaves the source node and that the switching node accesses the target node; or the first message is used to indicate that the switching node accesses the target node, and the second message is used to indicate that the switching node accesses the target node.

With reference to the first possible implementation of the second aspect, in a sixteenth possible implementation of the second aspect, the determining unit is configured to: if determining that the routing information of the first node includes information about the target node, determine that the third node is a child node of the first node.

With reference to the sixteenth possible implementation of the second aspect, in a seventeenth possible implementation of the second aspect, the first message is used to indicate that the switching node leaves the source node and that the switching node accesses the target node, and the second message is used to indicate that the switching node accesses the target node; or the first message is used to indicate that the switching node accesses the target node, and the second message is used to indicate that the switching node accesses the target node.

With reference to the first possible implementation of the second aspect, in an eighteenth possible implementation of the second aspect, the determining unit is configured to: if determining that information about the target node is different from information about the first node, determine that the third node is a child node of the first node.

With reference to the eighteenth possible implementation of the second aspect, in a nineteenth possible implementation of the second aspect, the first message is used to indicate that the switching node accesses the target node, and the second message is used to indicate that the switching node accesses the target node.

With reference to any one of the sixteenth to the nineteenth possible implementations of the second aspect, in a twentieth possible implementation of the second aspect, the determining unit is configured to determine, based on the routing information of the first node, that a next hop to the target node is the third node.

According to a third aspect, a device is disclosed, where the device is used as a first node and includes a transceiver and a processor. The transceiver receives a first message sent by a second node, where the first message is used to indicate that a switching node leaves a source node and/or that a switching node accesses a target node, the source node is a node to which the switching node before switching is connected, and the target node is a node to which the switching node after switching is connected. The processor updates routing information of the first node based on the first message received by the transceiver. The first node is any one of the following nodes: the target node, the source node, a core node, a first relay node between the target node and the core node, and a second relay node between the source node and the core node. The core node is a first common upstream node for the target node and the source node. The second node is any one of the following nodes: the switching node, the target node, the source node, the core node, the first relay node, and the second relay node.

With reference to the third aspect, in a first possible implementation of the third aspect, the processor further determines, based on the first message, a third node that is to receive a second message; and the transceiver further sends the second message to the third node, where the second message is used to indicate that the switching node leaves the source node and/or that the switching node accesses the target node, where the third node is any one of the following nodes: the source node, the core node, the target node, the first relay node, and the second relay node.

With reference to the first possible implementation of the third aspect, in a second possible implementation of the third aspect, that the first node determines, based on the first message, a third node that is to receive a second message includes: if determining that the routing information of the first node does not include information about the switching node and/or that the routing information of the first node does not include information about the source node, the first node determines that the third node is a parent node of the first node.

With reference to the second possible implementation of the third aspect, in a third possible implementation of the third aspect, the first message is used to indicate that the switching node leaves the source node and that the switching node accesses the target node, and the second message is used to indicate that the switching node leaves the source node and that the switching node accesses the target node; or the first message is used to indicate that the switching node accesses the target node, and the second message is used to indicate that the switching node accesses the target node.

With reference to the first possible implementation of the third aspect, in a fourth possible implementation of the third aspect, the processor is further configured to: if determining that the routing information of the first node includes information about the switching node and/or that the routing information of the first node includes information about the source node, determine that the third node is a child node of the first node.

With reference to the fourth possible implementation of the third aspect, in a fifth possible implementation of the third aspect, the first message is used to indicate that the switching node leaves the source node and that the switching node accesses the target node, and the second message is used to indicate that the switching node leaves the source node; or the first message is used to indicate that the switching node leaves the source node and that the switching node accesses the target node, and the second message is used to indicate that the switching node leaves; or the first message is used to indicate that the switching node accesses the target node, and the second message is used to indicate that the switching node leaves.

With reference to the third aspect, in a sixth possible implementation of the third aspect, if determining that the routing information of the first node includes information about the switching node and that the switching node before switching is not a child node of the first node, the processor further determines that the third node is a child node of the first node.

With reference to the sixth possible implementation of the third aspect, in a seventh possible implementation of the third aspect, the first message is used to indicate that the switching node leaves, and the second message is used to indicate that the switching node leaves.

With reference to the first possible implementation of the third aspect, in an eighth possible implementation of the third aspect, the processor is further configured to: if determining that information about the source node is different from information about the first node, determine that the third node is a child node of the first node; and/or if the first node determines that the routing information of the first node includes information about the switching node and that the switching node before switching is not a child node of the first node, determine that the third node is a child node of the first node.

With reference to the eighth possible implementation of the third aspect, in a ninth possible implementation of the third aspect, the first message is used to indicate that the switching node leaves the source node, and the second message is used to indicate that the switching node leaves the source node.

According to a fourth aspect, a computer-readable storage medium is disclosed, where the computer-readable storage medium stores an instruction, and when the instruction runs on the device in the second aspect and any possible implementation of the second aspect, the device is enabled to perform the route update method in the first aspect and each possible implementation of the first aspect.

According to a fifth aspect, a wireless communications apparatus is disclosed, where the wireless communications apparatus stores an instruction, and when the wireless communications apparatus runs on the device in the second aspect and any possible implementation of the second aspect, the device is enabled to perform the route update method in the first aspect and each possible implementation of the first aspect. In an exemplary implementation, the wireless communications apparatus may be a chip.

For detailed descriptions about the second aspect, the third aspect, the fourth aspect, the fifth aspect, and the implementations thereof in this application, refer to detailed descriptions in the first aspect and the implementations of the first aspect. In addition, for beneficial effects of the second aspect, the third aspect, the fourth aspect, the fifth aspect, and the implementations thereof, refer to analysis of beneficial effects of the first aspect and the implementations of the first aspect. Details are not described again herein.

According to a sixth aspect, an embodiment of this application provides a scheduling request cancellation method, including: determining, by a device, that a first scheduling request is triggered; and when a medium access control protocol data unit is sent, and the medium access control protocol data unit includes a first buffer status report, canceling, by the device, the first scheduling request.

With reference to the sixth aspect, in a first possible implementation of the sixth aspect, the method further includes: the first buffer status report includes a first buffer status, and the first buffer status is a buffer status up to the last event that triggers a buffer status report.

With reference to the first possible implementation of the sixth aspect, in a second possible implementation of the sixth aspect, the method further includes: the first buffer status is a buffer status up to the last event that triggers a buffer status report prior to the medium access control protocol data unit assembly.

With reference to the sixth aspect, or the first or the second possible implementation of the sixth aspect, in a third possible implementation of the sixth aspect, the method further includes: the first scheduling request is a scheduling request triggered prior to the medium access control protocol data unit assembly; or the first scheduling request is a scheduling request triggered by a second buffer status report, where the medium access control protocol data unit includes a buffer status that exists when an event triggers the second buffer status report.

With reference to the sixth aspect, in a fourth possible implementation of the sixth aspect, the method further includes: the first buffer status report does not include a first buffer status, and the first buffer status is a buffer status up to the last event that triggers a buffer status report.

With reference to the fourth possible implementation of the sixth aspect, in a fifth possible implementation of the sixth aspect, the method further includes: the first scheduling request is a scheduling request triggered prior to the medium access control protocol data unit assembly; or the first scheduling request is a scheduling request triggered by a second buffer status report, where the medium access control protocol data unit includes a buffer status that exists when an event triggers the second buffer status report.

With reference to the sixth aspect or any one of the first to the fifth possible implementations of the sixth aspect, in a sixth possible implementation of the sixth aspect, the method further includes: stopping, by the device, a scheduling request prohibit timer of the first scheduling request.

According to a seventh aspect, an embodiment of this application provides a buffer status report cancellation method, including: determining, by a device, that a first buffer status report is triggered; and when a medium access control protocol data unit is sent, and the medium access control protocol data unit includes a buffer status report, canceling, by the device, the first buffer status report.

With reference to the seventh aspect, in a first possible implementation of the seventh aspect, the method further includes: the first buffer status report is a buffer status report triggered prior to the medium access control protocol data unit assembly.

With reference to the seventh aspect, in a second possible implementation of the seventh aspect, the method further includes: the medium access control protocol data unit includes a buffer status that exists when an event triggers the first buffer status report.

According to an eighth aspect, a device is disclosed, where the device includes: a determining unit, where the determining unit is configured to determine that a first scheduling request is triggered; and a cancellation unit, where when a medium access control protocol data unit is sent, and the medium access control protocol data unit includes a first buffer status report, the cancellation unit is configured to cancel the first scheduling request.

With reference to the eighth aspect, in a first possible implementation of the eighth aspect, the device further includes: the first buffer status report includes a first buffer status, and the first buffer status is a buffer status up to the last event that triggers a buffer status report.

With reference to the first possible implementation of the eighth aspect, in a second possible implementation of the eighth aspect, the device further includes: the first buffer status is a buffer status up to the last event that triggers a buffer status report prior to the medium access control protocol data unit assembly.

With reference to the eighth aspect, or the first or the second possible implementation of the eighth aspect, in a third possible implementation of the eighth aspect, the device further includes: the first scheduling request is a scheduling request triggered prior to the medium access control protocol data unit assembly; or the first scheduling request is a scheduling request triggered by a second buffer status report, where the medium access control protocol data unit includes a buffer status that exists when an event triggers the second buffer status report.

With reference to the eighth aspect, in a fourth possible implementation of the eighth aspect, the device further includes: the first buffer status report does not include a first buffer status, and the first buffer status is a buffer status up to the last event that triggers a buffer status report.

With reference to the fourth possible implementation of the eighth aspect, in a fifth possible implementation of the eighth aspect, the device further includes: the first scheduling request is a scheduling request triggered prior to the medium access control protocol data unit assembly; or the first scheduling request is a scheduling request triggered by a second buffer status report, where the medium access control protocol data unit includes a buffer status that exists when an event triggers the second buffer status report.

With reference to the eighth aspect or any one of the first to the fifth possible implementations of the eighth aspect, in a sixth possible implementation of the eighth aspect, the device further includes a stopping device, where the stopping device is configured to stop a scheduling request prohibit timer of the first scheduling request.

According to a ninth aspect, a device is disclosed, where the device includes: a determining unit, where the determining unit is configured to determine that a first buffer status report is triggered; and a cancellation unit, where when a medium access control protocol data unit is sent, and the medium access control protocol data unit includes a buffer status report, the cancellation unit is configured to cancel the first buffer status report.

With reference to the ninth aspect, in a first possible implementation of the ninth aspect, the device further includes: the first buffer status report is a buffer status report triggered prior to the medium access control protocol data unit assembly.

With reference to the ninth aspect, in a second possible implementation of the ninth aspect, the device further includes: the medium access control protocol data unit includes a buffer status that exists when an event triggers the first buffer status report.

According to a tenth aspect, a device is disclosed, where the device includes a processor, where the processor determines that a first scheduling request is triggered; and when a medium access control protocol data unit is sent, and the medium access control protocol data unit includes a first buffer status report, the processor is configured to cancel the first scheduling request.

With reference to the tenth aspect, in a first possible implementation of the tenth aspect, the device further includes: the first buffer status report includes a first buffer status, and the first buffer status is a buffer status up to the last event that triggers a buffer status report.

With reference to the first possible implementation of the tenth aspect, in a second possible implementation of the tenth aspect, the device further includes: the first buffer status is a buffer status up to the last event that triggers a buffer status report prior to the medium access control protocol data unit assembly.

With reference to the tenth aspect, or the first or the second possible implementation of the tenth aspect, in a third possible implementation of the tenth aspect, the device further includes: the first scheduling request is a scheduling request triggered prior to the medium access control protocol data unit assembly; or the first scheduling request is a scheduling request triggered by a second buffer status report, where the medium access control protocol data unit includes a buffer status that exists when an event triggers the second buffer status report.

With reference to the tenth aspect, in a fourth possible implementation of the tenth aspect, the device further includes: the first buffer status report does not include a first buffer status, and the first buffer status is a buffer status up to the last event that triggers a buffer status report.

With reference to the fourth possible implementation of the tenth aspect, in a fifth possible implementation of the tenth aspect, the device further includes: the first scheduling request is a scheduling request triggered prior to the medium access control protocol data unit assembly; or the first scheduling request is a scheduling request triggered by a second buffer status report, where the medium access control protocol data unit includes a buffer status that exists when an event triggers the second buffer status report.

With reference to the tenth aspect or any one of the first to the fifth possible implementations of the tenth aspect, in a sixth possible implementation of the tenth aspect, the device further includes: stopping, by the processor, a scheduling request prohibit timer of the first scheduling request.

According to an eleventh aspect, a device is disclosed, where the device includes a processor, where the processor determines that a first buffer status report is triggered; and when a medium access control protocol data unit is sent, and the medium access control protocol data unit includes a buffer status report, the processor cancels the first buffer status report.

With reference to the eleventh aspect, in a first possible implementation of the eleventh aspect, the device further includes: the first buffer status report is a buffer status report triggered prior to the medium access control protocol data unit assembly.

With reference to the eleventh aspect, in a second possible implementation of the eleventh aspect, the device further includes: the medium access control protocol data unit includes a buffer status that exists when an event triggers the first buffer status report.

According to a twelfth aspect, a computer-readable storage medium is disclosed, where the computer-readable storage medium stores an instruction, and when the instruction runs on the device in the eighth aspect and any possible implementation of the eighth aspect, the device is enabled to perform the scheduling request cancellation method in the sixth aspect and each possible implementation of the sixth aspect.

According to a thirteenth aspect, a computer-readable storage medium is disclosed, where the computer-readable storage medium stores an instruction, and when the instruction runs on the device in the ninth aspect and any possible implementation of the ninth aspect, the device is enabled to perform the buffer status report cancellation method in the seventh aspect and each possible implementation of the seventh aspect.

According to a fourteenth aspect, a wireless communications apparatus is disclosed, where the wireless communications apparatus stores an instruction, and when the wireless communications apparatus runs on the device in the eighth aspect and any possible implementation of the eighth aspect, the device is enabled to perform the scheduling request cancellation method in the sixth aspect and each possible implementation of the sixth aspect. In an exemplary implementation, the wireless communications apparatus may be a chip.

According to a fifteenth aspect, a wireless communications apparatus is disclosed, where the wireless communications apparatus stores an instruction, and when the wireless communications apparatus runs on the device in the ninth aspect and any possible implementation of the ninth aspect, the device performs the buffer status report cancellation method in the seventh aspect and each possible implementation of the seventh aspect. In an exemplary implementation, the wireless communications apparatus may be a chip.

For detailed descriptions about the eighth aspect, the tenth aspect, the twelfth aspect, the fourteenth aspect, and the implementations thereof in this application, refer to detailed descriptions about the sixth aspect and the implementations of the sixth aspect. In addition, for beneficial effects of the eighth aspect, the tenth aspect, the twelfth aspect, the fourteenth aspect, and the implementations thereof, refer to beneficial effects of the sixth aspect and the implementations of the sixth aspect. Details are not described again herein.

For detailed descriptions about the ninth aspect, the eleventh aspect, the thirteenth aspect, the fifteenth aspect, and the implementations thereof in this application, refer to detailed descriptions about the seventh aspect and the implementations of the seventh aspect. In addition, for beneficial effects of the ninth aspect, the eleventh aspect, the thirteenth aspect, the fifteenth aspect, and the implementations thereof,

DESCRIPTION OF EMBODIMENTS

It should be noted that, "A and/or B" in the present application may be understood as any one of "A and B", or "A", or "B". The terms "first", "second", and so on in the specification and claims and the drawings of the present application are used to distinguish similar objects instead of describing a specific order or sequence.

Figure 1:
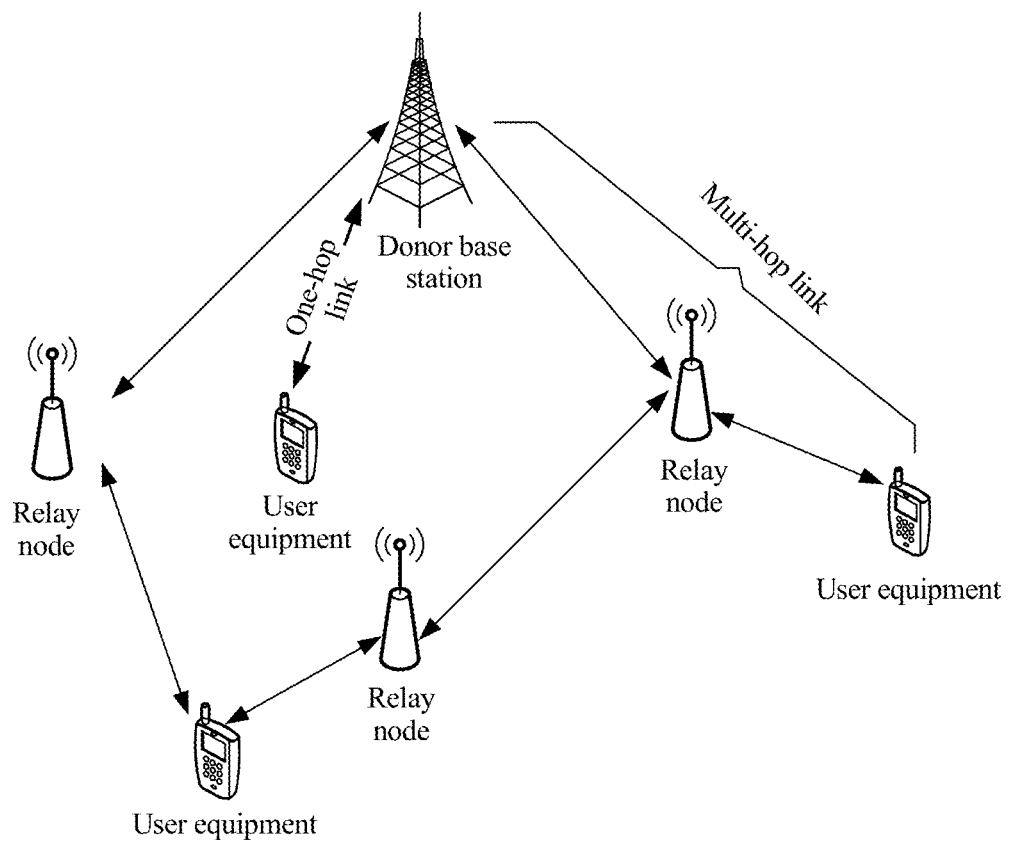
FIG. 1 is a structural diagram of an IAB network according to an embodiment of this application.

A 5th Generation (5G) new radio (NR) technology supports integrated access and backhaul (IAB). FIG. 1 is a possible structural diagram of an IAB network. As shown in FIG. 1, an RN may be deployed between a donor base station and a UE. Data sent by the base station to the UE or data sent by the UE to the base station is forwarded by the RN.

The donor base station is directly connected to a core network, and a plurality of RNs may be connected to the donor base station. The UE may be indirectly connected to the donor base station by using one or more RNs. To be specific, a multi-hop path or a plurality of connections exist between the UE and the donor base station. A link between the donor base station and the RN and a link between RNs may be backhaul links or fronthaul links. Alternatively, the UE may be directly connected to the donor base station. To be specific, a one-hop path exists between the UE and the donor base station, and a link between the donor base station and the UE and a link between the RN and the UE may be access links.

Because a plurality of hops or connections exist in the network, a formed network topology may be a hierarchical topology or a mesh topology. In a scenario in which the UE is not directly connected to the donor base station, when the donor base station sends a data packet to the UE, first, the donor base station needs to determine an RN to which the data packet is sent. In addition, each RN in a path from the donor base station to the UE needs to determine, based on routing information of the RN, which RN is a next hop to the UE, and forwards the received data packet to the next-hop RN. When the network topology changes, for example, when an RN switches from a currently connected RN to another RN, if a data packet is still forwarded based on original routing information, the data packet is lost. Therefore, when the RN switches, the RN needs to update the routing information of the RN.

In the prior art, when the network topology changes due to switching of an RN, each RN in a path to the donor base station from the RN before switching updates routing information. In addition, all RNs in a path to the donor base station from the RN after switching also update routing information. For example, referring to FIG. 2, an RN 9 leaves an RN 7 and joins an RN 8. When the RN 7 discovers that the RN 9 leaves, the RN 7 sends a message to a parent node RN 6 of the RN 7 to indicate "the RN 9 leaves the RN 7". The RN 6 updates routing information of the RN 6 based on the message, and continues to send a message to a parent node RN 3 of the RN 6 to indicate "the RN 9 leaves the RN 7". In this way, a message indicating "the RN 9 leaves the RN 7" is sent hop by hop to an upstream node, until the message reaches the donor base station. The donor base station and each RN that receives "the RN 9 leaves the RN 7" update their routing information based on the message "the RN 9 leaves the RN 7". Further, when the RN 8 discovers that the RN 9 joins the RN 8, the RN 8 sends a message to a parent node RN 5 of the RN 8 to indicate "the RN 9 joins the RN 8". The RN 5 updates routing information of the RN 5 based on the message, and continues to send a message to a parent node RN 3 of the RN 5 to indicate "the RN 9 joins the RN 8". In this way, a message indicating "the RN 9 leaves the RN 7" is sent hop by hop to an upstream node, until the message reaches the donor base station. The donor base station and each RN that receives "the RN 9 joins the RN 8" update their routing information based on the message "the RN 9 joins the RN 8".

Generally, routing information of an RN indicates a next hop in a path from the RN to a node (an RN or a UE). Actually, the change of the network topology does not affect routing information of some RNs. For example, in FIG. 2, the RN 8 switches from the RN 6 to the RN 7. For the donor base station, a next hop to the RN 8 is still the RN 1; and for the RN 1, a next hop to the RN 8 is still the RN 3. Therefore, the donor base station or the RNs actually do not need to update their routing information, and do not need to receive the message "the RN 9 joins the RN 8" or the message "the RN 9 leaves the RN 7" either. Redundant signaling overheads are caused. In particular, after the network topology changes, the donor base station can resend a data packet from the new path only after all the RNs in the path to the donor station from the RN before switching and all the RNs in the path to the donor base station from the RN after switching update their routing information. Therefore, a relatively long data interruption time is caused.

An embodiment of the present application provides a route update method. After a node switches, a first node receives a first message sent by a second node, where the first message is used to indicate that the switching node leaves a source node and/or that the switching node accesses a target node. The source node is a node to which the switching node before switching is connected, and the target node is a node to which the switching node after switching is connected. The first node may further update routing information of the first node based on the first message. Specifically, the first node is any one of the following nodes: the target node, the source node, a core node, a first relay node between the target node and the core node, and a second relay node between the source node and the core node. The second node is any one of the following nodes: the switching node, the target node, the source node, the core node, the first relay node, and the second relay node. The core node is a first common upstream node for the target node and the source node. In the prior art, after a node in an IAB network switches, each node in a path to a donor base station from the node before switching updates routing information. In addition, all nodes in a path to the donor base station from the node after switching also update routing information. In comparison, in this embodiment of the present application, only the core node and a node below the core node update routes, but other nodes in the IAB network do not need to update routes, and the nodes do not need to be notified by using signaling either. This reduces signaling overheads. Therefore, a quantity of nodes that update routes is also reduced greatly, communication of the entire network can be recovered within a relatively short time, and a data interruption time is shortened.

It should be noted that, names of nodes (for example, the first node, the core node, and the relay node) in this embodiment of the present application are for ease of description only, and the names of the nodes are not limited to the examples provided by this embodiment of the present application. Any device complying with a corresponding function, for example, a base station, and an access point (AP), may be included in the scope of this embodiment of the present application. In addition, in this embodiment of the present application, a node below a node or a downstream node of a node is a node close to the node, in a direction that approaches a UE; and a node above a node or an upstream node of a node is a node close to the node, in a direction that approaches a core network device (for example, a donor base station).

In this application, the device may be a network device. In the following embodiments, a network device is used as an example for description. In addition, the user equipment or the like may be used as a device and included in the scope of the idea of this application.

Figure 3:
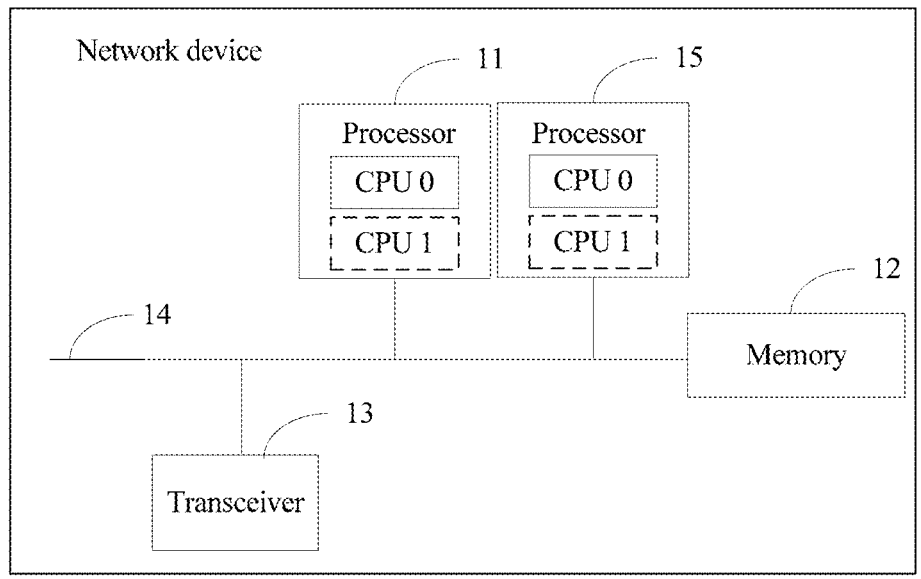
FIG. 3 is a structural block diagram of a network device according to an embodiment of the present application.

The route update method provided by this embodiment of the present application may be applied to a network device shown in FIG. 3. The network device may be the node in this embodiment of the present application. The node may be any one of the following nodes: a switching node, a target node, a source node, a first relay node, a second relay node, and a core node.

As shown in FIG. 3, the network device may include at least one processor 11, a memory 12, a transceiver 13, and a communications bus 14.

The following describes each component of the network device in detail with reference to FIG. 3.

The processor 11 is a control center of the network device, and may be one processor, or may be a collective term for a plurality of processing elements. For example, the processor 11 is a central processing unit (CPU), or may be an application-specific integrated circuit (ASIC), or one or more integrated circuits configured to implement this embodiment of the present application, for example, one or more microprocessors (DSP), or one or more field programmable gate arrays (FPGA).

The processor 11 may perform various functions of the network device by running or executing a software program stored in the memory 12 and invoking data stored in the memory 12.

In an exemplary implementation of an embodiment, the processor 11 may include one or more CPUs, for example, a CPU 0 and a CPU 1 in FIG. 3.

In an exemplary implementation of an embodiment, the network device may include a plurality of processors, for example, the processor 11 and a processor 15 in FIG. 3. Each of these processors may be a single-core processor, or may be a multi-core processor. The processor herein may be one or more devices, circuits, and/or processing cores used to process data (such as a computer program instruction).

The memory 12 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. This does not constitute a limitation herein. The memory 12 may exist independently, and is connected to the processor 11 by using the communications bus 14. Alternatively, the memory 12 may be integrated with the processor 11.

The memory 12 is configured to store a software program used to execute the solution of the present application, where the software program is executed under control of the processor 11.

The transceiver 13 is a type of apparatus using any transceiver, and is configured to communicate with another node in the system shown in FIG. 1, for example, another relay node, a core node, a target node, or a source node, or is configured to implement communication between the network device and the base station in FIG. 1, or may be further configured to communicate with a communications network, such as an Ethernet, a radio access network (RAN), or a wireless local area network (WLAN). The transceiver 13 may include a receiving unit for implementing a receiving function and a sending unit for implementing a sending function.

The communications bus 14 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of indication, the bus is indicated by using only one bold line in FIG. 3. However, it does not indicate that there is only one bus or only one type of bus.

A device structure shown in FIG. 3 does not constitute a limitation on the network device. More or fewer components than those shown in the figure may be included, or some components are combined, or different component arrangements are used.

Figure 4:
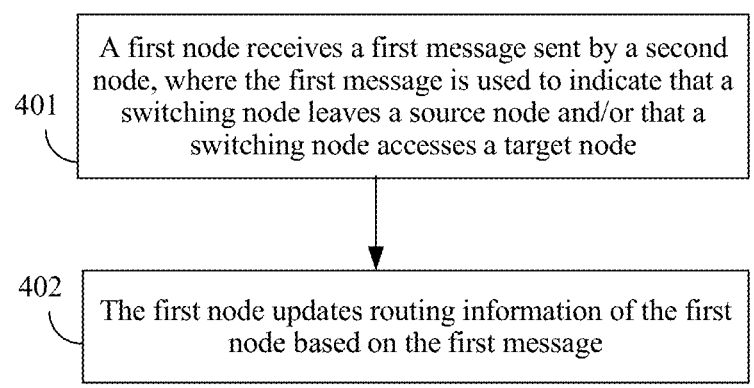
FIG. 4 is a flowchart of a route update method according to an embodiment of the present application.

An embodiment of the present application provides a route update method. As shown in FIG. 4, the method includes the following steps.

401. A first node receives a first message sent by a second node, where the first message is used to indicate that a switching node leaves a source node and/or that a switching node accesses a target node.

Figure 2:
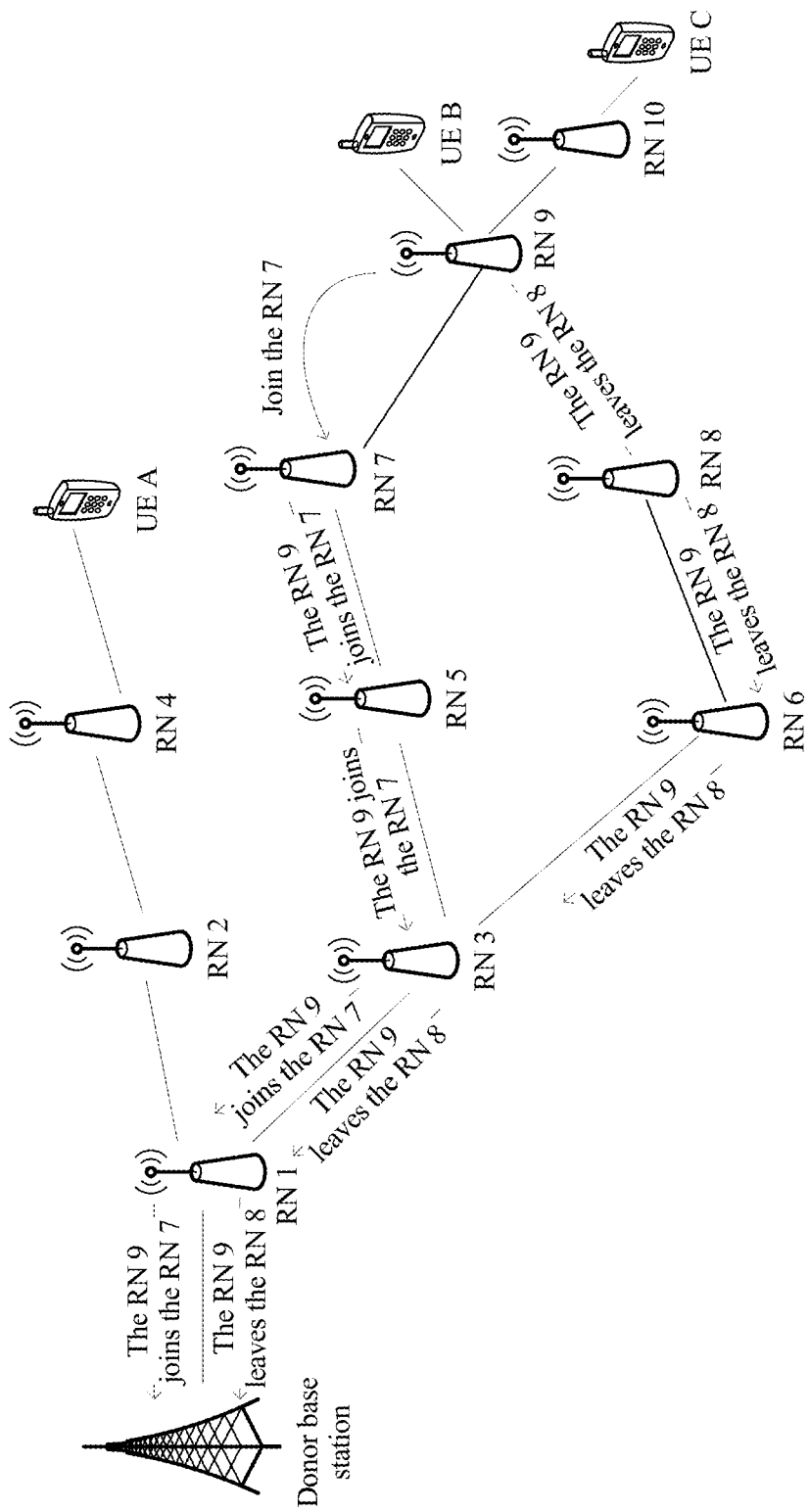
FIG. 2 is a schematic diagram of a route update in the prior art.

It should be noted that, in this embodiment of the present application, the source node is a node to which the switching node before switching is connected, and the target node is a node to which the switching node after switching is connected. In addition, the switching node is an RN that switches from the source node to the target node. The switching node accessing the target node may be considered as that the switching node joins the target node, that is, the switching node establishes a connection to the target node. The source node may be a donor base station or an RN, and the target node may be a donor base station or an RN. As shown in FIG. 2, the switching node is an RN 9, the target node may be an RN 8, and the source node may be an RN 7.

In an exemplary implementation, the first node is any one of the following nodes: the target node, the source node, a core node, a first relay node, and a second relay node.

The second node is any one of the following nodes: the switching node, the target node, the source node, the core node, the first relay node, and the second relay node.

In an exemplary implementation, the first node and the second node may be different nodes. Further, the first node may be directly connected to the second node.

In addition, the core node may be a first common upstream node for the target node and the source node. Referring to the network shown in FIG. 2, the RN 9 leaves the RN 7 and joins the RN 8. To be specific, the RN 7 is the source node, the RN 8 is the target node, and a first common upstream node for the RN 7 and the RN 8 may be considered as a first convergence point of paths in which the RN 7 and the RN 8 are located, in a direction that approaches a donor base station, for example, an RN 3 in FIG. 2.

In an exemplary implementation, the core node may also be a target node or a source node.

The first relay node is a relay node between the target node and the core node. To be specific, the target node may not be directly connected to the core node, but is indirectly connected to the core node by using one or more relay nodes. In this embodiment of the present application, the one or more relay nodes between the target node and the core node, for example, an RN 5 in FIG. 2, may be referred to as the first relay node. Certainly, the target node may also be directly connected to the core node, that is, the first relay node does not exist.

The second relay node is a relay node between the source node and the core node. To be specific, the source node may not be directly connected to the core node, but is indirectly connected to the core node by using one or more relay nodes. In this embodiment of the present application, the one or more relay nodes between the source node and the core node, for example, an RN 6 in FIG. 2, may be referred to as the second relay node. Certainly, the source node may also be directly connected to the core node, that is, the second relay node does not exist.

In this embodiment of the present application, the core node and a node below the core node may receive a message for indicating node switching, for example, the foregoing first message. Referring to the network shown in FIG. 2, the first node may be any one of the RN 3, the RN 5, the RN 6, the RN 7, and the RN 8; and the second node may be any one of the RN 3, the RN 5, the RN 6, the RN 7, the RN 8, and the RN 9. Certainly, the first node and the second node are different nodes. For example, the RN 9 (second node) sends the first message to the RN 8 (first node), or the RN 5 (second node) sends the first message to the RN 3 (first node).

It should be noted that, the first message may be used to indicate that the switching node leaves the source node and that the switching node accesses the target node. For example, the first message is used to indicate that a node leaves a node A and accesses a node B. In this implementation, the first message may carry information about the switching node, information about the target node, and information about the source node. In this embodiment of the present application, information about a node may be understood as a piece of information capable of indicating the node, or may be understood as a piece of information indicating a routing mode of the node in routing information, or may be considered as an identifier of the node. For example, the information about the switching node may be an identifier of the switching node, the information about the target node may be an identifier of the target node, and the information about the source node may be an identifier of the source node. This is not limited in this embodiment of the present application. Further, whether an identifier indicates the source node or the target node or the switching node may be identified by using a sequence of the identifier of the switching node, the identifier of the target node, and the identifier of the source node that are arranged in the first message. For example, the first message includes "RN7, RN8, and RN9", where the identifier of the source node is arranged in the first position, the identifier of the target node is arranged in the middle position, and the identifier of the switching node is arranged in the last position. Certainly, a node identification solution using a sequence of node identifiers arranged in the first message is not limited to the foregoing possible implementation, and other possible implementations are also available. This is not limited in this embodiment of the present application.

In another implementation, a node corresponding to a node identifier in the first message may be further distinguished by using bits. For example, the first message includes "00RN7, 01RN8, and 10RN9", where "00" is used to identify the source node, that is, the RN 7 is the identifier of the source node; "01" is used to identify the target node, that is, the RN 8 is the identifier of the target node; and "10" is used to identify the switching node, that is, the RN 9 is the identifier of the switching node.

Certainly, a node corresponding to a node identifier in the first message may be further distinguished in other manners, or a corresponding node is indicated in other manners (without using a node identifier). This is not limited in this embodiment of the present application.

In some embodiments, the first message may be used to indicate that the switching node leaves the source node. For example, the first message is used to indicate that a node leaves the node A. The first message may carry the identifier of the switching node and the identifier of the source node. For how to distinguish whether the node corresponding to the node identifier in the first message is the switching node or the source node, refer to the foregoing several implementations. Details are not described again herein in this embodiment of the present application.

In some embodiments, the first message may be used to indicate that the switching node leaves. In this implementation, the first message may carry the identifier of the switching node.

In some embodiments, the first message is used to indicate that the switching node accesses the target node. For example, the first message is used to indicate that a node joins the node B. The first message may carry the identifier of the switching node and the identifier of the target node. For how to distinguish whether the node corresponding to the node identifier in the first message is the switching node or the target node, refer to the foregoing several implementations. Details are not described again herein in this embodiment of the present application.

In some embodiments, the switching node may not be an end of a path, that is, another RN may be further connected after the switching node. Referring to FIG. 2, a child node of the switching node RN 9 is an RN 10, and the RN 9 stores routing information related to the RN 10, for example, "directly connected to the RN 10". Based on this, when the switching node switches, the first message sent by the first node may further carry routing information of the switching node. For example, the first message sent by the RN 9 further carries routing information "directly connected to the RN 10" of the RN 9. It should be noted that, a child node of a node may be understood as a downstream node directly connected to the node, that is, may be understood as a next hop directly connected to the node. "Directly connected to the node B" in routing information of the node A may be understood as "the node B is a child node of the node A", or may be understood as "the node B is a next hop directly connected to the node A". Specific content of the routing information is not limited in this embodiment of the present application.

402. The first node updates routing information of the first node based on the first message.

Specifically, in an IAB network structure, there is a determined path from the donor base station to each UE. Based on routing information stored by each node (RN), the path from the donor base station to the UE may be determined. Each node may record the routing information in a form of a routing table.

Further, the routing table includes a next hop corresponding to each path, which may also be understood as a next hop to a node.

For example, referring to the IAB network structure shown in FIG. 2, before the RN 9 switches, paths in which the RN 3 is located include: donor base station-RN1-RN3-RN6-RN8-RN9-RN10, and donor base station-RN1-RN3-RN5-RN7. A routing table of the RN 3 may be: directly connected to the RN 5, directly connected to the RN 6, RN8→RN 6, RN7→RN5, RN9→RN6, and RN10→RN6. RN8→RN6 represents that a next hop from the RN 3 to the RN 8 is the RN 6; RN7→RN5 represents that a next hop from the RN 3 to the RN 7 is the RN 5; RN9→RN6 represents that a next hop from the RN 3 to the RN 9 is the RN 6; and RN10→RN6 represents that a next hop from the RN 3 to the RN 10 is the RN 6.

In an exemplary implementation, a path may be indicated by a path identifier, and a next hop may be indicated by a node identifier. The path identifier may be an identifier of a node, indicating a path from the donor base station to the node. For example, an RN 4 may indicate the path "donor base station-RN1-RN2-RN4". Alternatively, a path may be indicated by a dedicated path identifier. For example, "path 4" indicates the path "donor base station-RN1-RN2-RN4". The next hop may be indicated by a node identifier. For example, "RN5" in the routing information "RN7→RN5" included in the routing table of the RN 3 is a node identifier, representing that a next hop from the RN 3 to the RN 7 is the RN 5. In an exemplary implementation, each data packet carries a path identifier and a UE identifier; and the donor base station and the RN may send data packets to correct UE by using routing information tables.

In some embodiments, the switching node may not be an end of a path, that is, another RN may be further connected after the switching node. If the switching node stores routing information related to lower-level nodes, the first message sent by the first node may further carry the routing information of the switching node. Further, a second message sent by the first node may further include the routing information of the switching node.

In some embodiments, based on the received first message, the first node may further notify another node of node switching. Specifically, the first node may determine, based on the first message, a third node that is to receive the second message, and send the second message to the third node. The second message is used to notify another node of node switching. In some embodiments, the second message is used to indicate that the switching node leaves the source node and/or that the switching node accesses the target node. In addition, the third node is any one of the following nodes: the source node, the core node, the target node, the first relay node, and the second relay node.

For example, referring to FIG. 2, the third node may be any one of the RN 3, the RN 5, the RN 6, the RN 7, and the RN 8. For example, the RN 9 (second node) sends the first message to the RN 7 (first node); and then the RN 7 may send the second message to the RN 5 (third node).

In this embodiment of the present application, a sequence of updating routes by the core node and a downstream node of the core node may include the following two cases:

Case 1: In some embodiments, the switching node notifies the target node of node switching, and may first trigger a downstream node of the core node in a new path (a path in which the switching node after switching is located) to update routing information of the downstream node based on joining of the switching node. Then the core node triggers a downstream node of the core node in an original path (a path in which the switching node before switching is located) to update routing information of the downstream node based on leaving of the switching node. Specifically, a processing procedure of each node may include the following several cases:

(1a) When the first node is the target node, the target node receives the first message sent by the switching node, where the switching node is the second node.

In an exemplary implementation, the first message sent by the switching node may be used to indicate that the switching node leaves the source node and that the switching node accesses the target node. For example, the first message may carry the identifier of the target node, the identifier of the source node, and the identifier of the switching node. The target node may determine whether routing information of the target node includes the identifier of the switching node. If the target node determines that the routing information of the target node does not include the identifier of the switching node, the target node determines that the third node is a parent node of the target node. Alternatively, the target node may determine whether routing information of the target node includes the identifier of the switching node and the identifier of the source node. If the target node determines that the routing information of the target node includes neither the identifier of the switching node nor the identifier of the source node, the target node determines that the third node is a parent node of the target node. Alternatively, the target node may determine whether routing information of the target node includes the identifier of the source node. If the target node determines that the routing information of the target node does not include the identifier of the source node, the target node determines that the third node is a parent node of the target node.

Further, the target node sends the second message to the parent node of the target node, where the second message is used to indicate that the switching node leaves the source node and that the switching node accesses the target node. Specifically, the second message may carry the identifier of the target node, the identifier of the source node, and the identifier of the switching node.

In some other embodiments, the first message sent by the switching node is used to indicate that the switching node accesses the target node. In an exemplary implementation, after the switching node has switched, the switching node reports the identifier of the switching node to the target node. It may be considered that the switching node indicates, to the target node, that the switching node accesses the target node. Further, the first message may carry the identifier of the switching node. Alternatively, the switching node first obtains the identifier of the target node. After the switching node has switched, the switching node sends the first message to the target node to indicate that the switching node accesses the target node. Specifically, the first message may carry the identifier of the switching node and the identifier of the target node.

In a scenario in which the first message indicates that the switching node accesses the target node, the target node may further determine whether the routing information of the target node includes the identifier of the switching node; and if the target node determines that the routing information of the target node does not include the identifier of the switching node, the target node determines that the third node is a parent node of the target node. In this case, the target node sends the second message to the parent node of the target node, where the second message is used to indicate that the switching node accesses the target node. Further, the second message carries the identifier of the target node and the identifier of the switching node.

In some embodiments, if the first message received by the target node carries the identifier of the target node, before the target node sends the second message to the parent node of the target node, the target node may further determine whether the identifier of the target node in the first message is the same as the identifier of the target node; and if the target node determines that the identifier of the target node in the first message is the same as the identifier of the target node, the target node sends the second message to the parent node of the target node.

It should be noted that, in this embodiment of the present application, a parent node of a node is an upstream node directly connected to the node, and the parent node of the target node is the first relay node directly connected to the target node. In addition, the target node may further update the routing information of the target node based on joining of the switching node, for example, add routing information "directly connected to the switching node". The switching node is the second node, the target node is the first node, and the first relay node connected to the target node or the core node is the third node.

(1b) When the first node is the first relay node, the first relay node receives the first message sent by a child node (second node) of the first relay node.

In an exemplary implementation, the first message received by the first relay node may be used to indicate that the switching node leaves the source node and that the switching node accesses the target node. For example, the first message may carry the identifier of the target node, the identifier of the source node, and the identifier of the switching node. The first relay node may determine whether routing information of the first relay node includes the identifier of the switching node. If the first relay node determines that the routing information of the first relay node does not include the identifier of the switching node, the first relay node determines that the third node is a parent node of the first relay node. Alternatively, the first relay node may determine whether routing information of the first relay node includes the identifier of the switching node and the identifier of the source node. If the first relay node determines that the routing information of the first relay node includes neither the identifier of the switching node nor the identifier of the source node, the first relay node determines that the third node is a parent node of the first relay node. Alternatively, the first relay node may determine whether routing information of the first relay node includes the identifier of the source node. If the first relay node determines that the routing information of the first relay node does not include the identifier of the source node, the first relay node determines that the third node is a parent node of the first relay node.

Further, the first relay node sends the second message to the parent node of the first relay node, where the second message is used to indicate that the switching node leaves the source node and that the switching node accesses the target node. Specifically, the second message may carry the identifier of the target node, the identifier of the source node, and the identifier of the switching node.

In some other embodiments, the first message received by the first relay node is used to indicate that the switching node accesses the target node. For example, the first message may carry the identifier of the switching node and the identifier of the target node. If the first relay node determines that the routing information of the first relay node does not include the identifier of the switching node, the first relay node determines that the third node is a parent node of the first relay node. In this case, the first relay node sends the second message to the parent node of the first relay node, where the second message is used to indicate that the switching node accesses the target node. Specifically, the second message carries the identifier of the target node and the identifier of the switching node.

To be specific, each first relay node between the target node and the core node may receive a first message sent by a child node (first relay node or target node) of the first relay node. After the first relay node determines that the routing information of the first relay node does not include the identifier of the switching node and/or that the routing information of the first relay node does not include the identifier of the source node, the first relay node sends the second message to the parent node of the first relay node, and updates the routing information of the first relay node based on joining of the switching node.

In some embodiments, before the first relay node sends the second message to the parent node of the first relay node, the first relay node may further determine that the routing information of the first relay node includes the identifier of the target node.

It should be noted that, in this embodiment of the present application, a child node of a node is a downstream node directly connected to the node, and the child node of the first relay node may be the target node or may be another first relay node. The first relay node may be the first node, the child node of the first relay node may be the second node, and the parent node of the first relay node may be the third node.

For example, the first relay node connected to the target node receives a message sent by the target node and indicating "the switching node leaves the source node and joins the target node", and determines whether the routing information of the first relay node includes the identifier of the switching node in the message, that is, determines whether the switching node is a node newly added in a path in which the first relay node is located; and if the routing information of the first relay node does not include the identifier of the switching node that is carried in the message, the first relay node connected to the target node determines that the switching node is a node newly added in the path in which the first relay node is located, and further sends a message "the switching node leaves the source node and joins the target node" to the parent node of the first relay node. The parent node of the first relay node may be the core node or may be another first relay node. Further, the first relay node further updates the routing information of the first relay node based on joining of the switching node, for example, adds routing information "a next hop to the switching node".

(1c) When the first node is the core node, the core node receives the first message sent by the first relay node (second node) directly connected to the core node.

Specifically, the first message received by the core node may be used to indicate that the switching node leaves the source node and that the switching node accesses the target node. For example, the first message may carry the identifier of the switching node, the identifier of the source node, and the identifier of the target node. The core node may determine whether routing information of the core node includes the identifier of the switching node and/or whether routing information of the core node includes the identifier of the source node. If the routing information of the core node includes the identifier of the switching node and/or the identifier of the source node, it indicates that the core node is a node in the path in which the switching node before switching is located. In addition, because the core node is also a node in the path in which the switching node after switching is located, routing information of an upstream node of the core node does not change due to switching of the switching node. In this case, the core node does not need to notify its parent node of node switching, but sends the second message to its child node. In this case, the child node of the core node is the third node. The second message sent by the core node may indicate that the switching node leaves. Specifically, the second message may include the identifier of the switching node.

In some other embodiments, the second message sent by the core node may be further used to indicate that the switching node leaves the source node. Specifically, the second message may carry the identifier of the source node and the identifier of the switching node.

In some other embodiments, the first message received by the core node may be further used to indicate that the switching node accesses the target node. For example, the first message may carry the identifier of the switching node and the identifier of the target node. The core node may determine whether the routing information of the core node includes the identifier of the switching node. If the routing information of the core node includes the identifier of the switching node, the core node does not need to notify its parent node of node switching, but sends the second message to its child node. In this case, the child node of the core node is the third node. The second message sent by the core node is used to indicate that the switching node leaves.

If the first message received by the core node includes the identifier of the target node, the core node may further determine whether the routing information of the core node includes the identifier of the target node. If the core node determines that the routing information of the core node includes the identifier of the target node, the core node sends the second message to the child node of the core node. In addition, the core node may further update the routing information of the core node based on the first message, for example, add routing information "a next hop to the switching node", and delete routing information related to the next hop corresponding to the path in which the switching node before switching is located. The core node may be the first node, the first relay node or the target node or the switching node may be the second node, and the child node of the core node is the third node. In a special case, if the core node is the source node, for example, if the node A before switching is connected to the node B, and the node A after switching is connected to a child node C of the node B, in this case, the node B is the source node and is also the core node. Further, the core node does not need to send the second message.

(1d) When the first node is the second relay node, the second relay node receives the first message sent by a parent node (second node) of the second relay node.

In an exemplary implementation, the first message received by the second relay node is used to indicate that the switching node leaves. Specifically, the first message may carry the identifier of the switching node. The second relay node determines whether routing information of the second relay node includes the identifier of the switching node and whether the switching node before switching is not a child node of the first node. If the second relay node determines that the routing information of the second relay node includes the identifier of the switching node and that the switching node before switching is not the child node of the first node, where "the switching node before switching is not the child node of the first node" may be further understood as "the routing information is not 'directly connected to the switching node'", the second relay node determines that the third node is a child node of the second relay node, and sends the second message to the third node, where the second message is used to indicate that the switching node leaves. Specifically, the second message may carry the identifier of the switching node. It should be noted that, the child node determined by the second relay node herein is a next hop in a path from the second relay node to the switching node.

In some other embodiments, the first message received by the second relay node indicates that the switching node leaves the source node. Specifically, the first message may carry the identifier of the source node and the identifier of the switching node. The second relay node may further determine whether the identifier of the source node in the first message is the same as the identifier of the second relay node. If the second relay node determines that the identifier of the source node in the first message is different from the identifier of the second relay node, the second relay node determines that the third node is a child node of the second relay node, and sends the second message to the child node of the second relay node. The second message is used to indicate that the switching node leaves the source node. Specifically, the second message may carry the identifier of the source node and the identifier of the switching node. It should be noted that, the child node determined by the second relay node herein is a next hop in a path from the second relay node to the switching node. Certainly, in this scenario, the second relay node may further determine whether the routing information of the second relay node includes the identifier of the switching node and whether the switching node before switching is not a child node of the first node; and if determining that the routing information of the second relay node includes the identifier of the switching node and that the switching node before switching is not the child node of the first node, where "the switching node before switching is not the child node of the first node" may be further understood as "the routing information is not 'directly connected to the switching node'", the second relay node determines that the third node is the child node of the second relay node.

To be specific, each second relay node between the source node and the core node may receive a first message sent by a parent node (the core node or another second relay node) of the second relay node, and determine that routing information of the second relay node includes the identifier of the switching node and that the switching node before switching is not the child node of the first node, or determine that an identifier of the second relay node is different from the identifier of the source node, that is, the second relay node is not the source node. In this case, the second relay node sends the second message to a child node of the second relay node. In addition, after each second relay node receives the first message sent by the parent node of the second relay node, the second relay node may update the routing information of the second relay node based on the first message, for example, delete routing information related to the next hop in the path in which the switching node is originally located. Therefore, a downstream node of the core node in the path in which the switching node before switching is located may update routing information of the downstream node based on node switching.

It should be noted that, the second relay node may receive the first message sent by the parent node (second node) of the second relay node. If the second relay node determines that the routing information of the second relay node includes the identifier of the switching node and that the switching node is a node directly connected to the second relay node, or determines that the identifier of the second relay node is the same as the identifier of the source node, that is, the second relay node is the source node, the second relay node does not need to send the second message to the child node of the second relay node, but only needs to update the routing information of the second relay node based on the first message, for example, delete routing information of the next hop in the old path in which the switching node is originally located.

In addition, in this embodiment of the present application, a child node of a node is a downstream node directly connected to the node. In an exemplary implementation, the first node (such as the core node or the second relay node) queries the routing information of the first node, and determines that a next hop to the source node in the routing information is the third node, or determines that a next hop to the switching node is the third node.

In some embodiments, if another downstream node (denoted as a downstream node) is further connected to the node that switches, when the node switches, the downstream node may also switch. If the downstream node also switches when the node switches, the first message sent by the switching node to the target node further needs to include the routing information of the switching node, and the routing information of the switching node records routing information related to the downstream node. Further, messages (such as the first message and the second message) sent between the target node, the first relay node, the core node, the second relay node, and the source node also need to carry the routing information of the switching node. Certainly, the target node, the first relay node, the core node, the second relay node, and the source node may further update their routing information based on the routing information of the switching node in the received message, for example, add a next hop to the downstream node, or delete a next hop to the downstream node.

Case 2: In some embodiments, the switching node notifies the source node of node switching, and may first trigger a downstream node of the core node in an original path (a path in which the switching node before switching is located) to update routing information of the downstream node based on leaving of the switching node. Then, the core node triggers a downstream node of the core node in a new path (a path in which the switching node after switching is located) to update routing information of the downstream node based on joining of the switching node. A processing procedure of each node may include the following several cases:

(2a) When the first node is the source node, the source node receives the first message sent by the switching node, where the switching node is the second node.

Specifically, the first message received by the source node is used to indicate that the switching node leaves the source node and that the switching node accesses the target node. For example, the first message may carry the identifier of the target node, the identifier of the source node, and the identifier of the switching node. The second relay node determines whether routing information of the second relay node includes the identifier of the target node. If the source node determines that the routing information of the source node does not include the identifier of the target node, the source node determines that the third node is a parent node of the source node, and the source node sends the second message to the parent node of the source node, where the second message is used to indicate that the switching node leaves the source node and that the switching node accesses the target node. For example, the second message carries the identifier of the target node, the identifier of the source node, and the identifier of the switching node.

In some other embodiments, the first message received by the source node is used to indicate that the switching node accesses the target node. For example, the first message may carry the identifier of the switching node and the identifier of the target node. If the source node determines that routing information of the source node does not include the identifier of the switching node, the source node determines that the third node is a parent node of the source node. In this case, the source node sends the second message to the parent node of the source node, where the second message is used to indicate that the switching node accesses the target node.

For example, the second message carries the identifier of the target node and the identifier of the switching node.

In some other embodiments, the first message received by the source node is used to indicate that the switching node leaves and that the switching node accesses the target node. For example, the first message may carry the identifier of the switching node and the identifier of the target node. If the source node determines that routing information of the source node does not include the identifier of the switching node, the source node determines that the third node is a parent node of the source node. In this case, the source node sends the second message to the parent node of the source node, where the second message is used to indicate that the switching node leaves and that the switching node accesses the target node. For example, the second message carries the identifier of the target node and the identifier of the switching node.

The parent node (which may be the second relay node) of the source node is the third node. Further, the source node updates the routing information of the source node, for example, deletes routing information "a next-hop node to the switching node". It should be noted that, before the first message is sent to the first node, the source node learns that the switching node switches and leaves the source node, and the source node updates the routing information of the source node based on leaving of the switching node.

(2b) When the first node is the second relay node, the second relay node receives the first message sent by a child node (second node) of the second relay node.

Specifically, the first message received by the second relay node is used to indicate that the switching node leaves the source node and that the switching node accesses the target node. For example, the first message may carry the identifier of the target node, the identifier of the source node, and the identifier of the switching node. The second relay node determines whether routing information of the second relay node includes the identifier of the target node. If the second relay node determines that the routing information of the second relay node does not include the identifier of the target node, the second relay node determines that the third node is a parent node of the second relay node, and the second relay node sends the second message to the parent node of the second relay node, where the second message is used to indicate that the switching node leaves the source node and that the switching node accesses the target node. For example, the second message carries the identifier of the target node, the identifier of the source node, and the identifier of the switching node.

In some other embodiments, the first message is used to indicate that the switching node accesses the target node. For example, the first message may carry the identifier of the switching node and the identifier of the target node. If the second relay node determines that routing information of the second relay node does not include the identifier of the switching node, the second relay node determines that the third node is a parent node of the second relay node. In this case, the second relay node sends the second message to the parent node of the second relay node, where the second message is used to indicate that the switching node accesses the target node. For example, the second message carries the identifier of the target node and the identifier of the switching node.

In some other embodiments, the first message received by the second relay node is used to indicate that the switching node leaves and that the switching node accesses the target node. For example, the first message may carry the identifier of the switching node and the identifier of the target node. If the second relay node determines that routing information of the second relay node does not include the identifier of the switching node, the second relay node determines that the third node is a parent node of the second relay node. In this case, the second relay node sends the second message to the parent node of the second relay node, where the second message is used to indicate that the switching node leaves and that the switching node accesses the target node. For example, the second message carries the identifier of the target node and the identifier of the switching node.

To be specific, each second relay node between the source node and the core node may receive a first message sent by a child node (which may be a second relay node or the source node) of the second relay node, and after determining that routing information of the second relay node does not include the identifier of the target node, send the second message to a parent node of the second relay node, and update routing information of the second relay node based on leaving of the switching node. The second relay node may be the first node, the child node of the second relay node may be the second node, and the parent node of the second relay node may be the third node.

For example, the second relay node connected to the source node receives a message sent by the source node and indicating "the switching node leaves the source node and joins the target node", and determines whether the routing information of the second relay node includes the identifier of the target node in the message. If the routing information of the second relay node does not include the identifier of the target node in the message, that is, the second relay node determines that the target node is not in a path in which the second relay node is located, and it may also be considered that the switching node after switching is not in the path in which the second relay node is located either, the second relay node sends a message "the switching node leaves the source node and joins the target node" to the parent node of the second relay node, instructing the parent node of the second relay node to update routing information. The parent node of the second relay node may be the core node or may be another second relay node. Further, the second relay node may further update the routing information of the second relay node based on leaving of the switching node, for example, delete routing information "a next hop to the switching node".

In some embodiments, before the second relay node sends the second message to the parent node of the second relay node, the second relay node may further determine that the routing information of the second relay node includes the identifier of the switching node and/or that the routing information of the second relay node includes the identifier of the source node.

(2c) When the first node is the core node, the core node receives the first message sent by the second relay node (second node) directly connected to the core node.

Specifically, the first message received by the core node is used to indicate that the switching node leaves the source node and that the switching node accesses the target node. For example, the first message may carry the identifier of the switching node, the identifier of the source node, and the identifier of the target node. The core node may determine whether routing information of the core node includes the identifier of the target node. If the routing information of the core node includes the identifier of the target node, it indicates that the core node is a common node in the paths in which the switching node before and after switching is located. In this embodiment of the present application, only the core node and a downstream node of the core node update routes. In this case, the core node does not need to notify its parent node of node switching, but sends the second message to its child node. In this case, the child node of the core node is the third node. In addition, the second message is used to indicate that the switching node accesses the target node. For example, the second message may carry the identifier of the target node and the identifier of the switching node.

In some other embodiments, the first message is used to indicate that the switching node accesses the target node. For example, the first message may carry the identifier of the switching node and the identifier of the target node. The core node may determine whether routing information of the core node includes the identifier of the target node. If the routing information of the core node includes the identifier of the target node, the core node does not need to notify its parent node of node switching, but sends the second message to its child node. In this case, the child node of the core node is the third node. The second message is used to indicate that the switching node accesses the target node. For example, the second message may carry the identifier of the target node and the identifier of the switching node.

For example, before the core node sends the second message to the child node of the core node, the core node may further determine that the routing information of the core node includes the identifier of the source node and/or that the routing information of the core node includes the identifier of the switching node. In addition, the core node may further update the routing information of the core node based on the first message, for example, add routing information "a next hop to the switching node", and delete routing information of a next hop in the old path in which the switching node is originally located.

The core node may be the first node, the second relay node or the source node may be the second node, the child node that receives the second message is the third node, and the child node is a next hop in a path from the core node to the target node.

(2d) When the first node is the first relay node, the first relay node receives the first message sent by a parent node of the first relay node, where the parent node of the first relay node is the second node.

Specifically, the first message received by the first relay node indicates that the switching node accesses the target node. For example, the first message may carry the identifier of the switching node and the identifier of the switching node. The first relay node determines that the identifier of the target node in the first message is different from the identifier of the first relay node. In this case, the first relay node determines that the third node is a child node of the first relay node, and sends the second message to the child node of the first relay node. The second message is used to indicate that the switching node accesses the target node.

To be specific, each first relay node between the target node and the core node may receive a first message sent by its parent node (the core node or the another first relay node), and determine that the identifier of the first relay node is different from the identifier of the target node in the first message, that is, the first relay node is not the target node. In this case, the first relay node sends the second message to its child node. In some embodiments, before the first relay node sends the second message to the child node of the first relay node, the first relay node may further determine that routing information of the first relay node includes the identifier of the target node. In addition, after each first relay node receives the first message sent by the parent node of the first relay node, the first relay node may update routing information of the first relay node based on the first message, for example, add routing information "a next hop to the switching node". Therefore, a downstream node of the core node in the path in which the switching node after switching is located may update routing information of the downstream node based on node switching.

In an exemplary implementation, the first node (such as the core node or the first relay node) queries the routing information of the first node, and determines that a next hop to the target node in the routing information is the third node.

In some embodiments, if another downstream node (denoted as a downstream node) is further connected to the node that switches, when the node switches, the downstream node may also switch. If the downstream node also switches when the node switches, the first message sent by the switching node to the source node further needs to include the routing information of the switching node, and the routing information of the switching node records routing information related to the downstream node. Further, messages (such as the first message and the second message) sent between the target node, the first relay node, the core node, the second relay node, and the source node also need to carry the routing information of the switching node. Certainly, the target node, the first relay node, the core node, the second relay node, and the source node may further update their routing information based on the routing information of the switching node in the received message, for example, add a next hop to the downstream node, or delete a next hop to the downstream node.

In the route update method provided by this embodiment of the present application, after a node switches, the first node receives the first message sent by the second node, where the first message is used to indicate that the switching node leaves the source node and/or that the switching node accesses the target node. The first node may further update the routing information of the first node based on the first message. Specifically, the first node is any one of the following nodes: the target node, the source node, the core node, the first relay node between the target node and the core node, and the second relay node between the source node and the core node. The second node is any one of the following nodes: the switching node, the target node, the source node, the core node, the first relay node, and the second relay node. To be specific, in this embodiment of the present application, after a network topology changes, only the core node and the node below the core node update routes, but other nodes in the IAB network do not need to update routes, and the nodes do not need to be notified by using signaling either. This reduces signaling overheads. In addition, because a quantity of nodes that update routes is reduced, communication of the entire network can be recovered within a relatively short time, and a data interruption time is shortened.

With reference to the accompanying drawings, the following describes a route update method provided by an embodiment of the present application. Specifically, nodes that need to add routing information first update routes. After the nodes add the routing information, nodes that need to delete routing information update their routing information. For example, referring to FIG. 5, when an RN 9 leaves an RN 8 and joins an RN 7, the RN 9 sends a message "the RN 9 leaves the RN 8 and joins the RN 7" to the target node RN 7, where the message "the RN 9 leaves the RN 8 and joins the RN 7" may carry identifiers of the three nodes, that is, the RN 9, the RN 8, and the RN 7.

Each node (RN) determines, based on a received message and routing information of the node, how to send a message to indicate node switching. Specifically, if a node determines that the identifier of the target node RN 7 in the received message is the same as an identifier of the node, that is, the node is the target node RN 7, the RN 7 sends a message to a parent node RN 5 of the RN 7 to indicate "the RN 9 leaves the RN 8 and joins the RN 7".

If a node determines that routing information of the node includes only the identifier of the target node but does not include the identifier of the switching node and/or the identifier of the source node, it indicates that the node is a first relay node, for example, the RN 5. The RN 5 needs to continue to send "the RN 9 leaves the RN 8 and joins the RN 7" to a parent node RN 3 of the RN 5. The RN 5 may further update a routing information table of the RN 5 based on the message, and specifically, add information "RN9→RN7", which means that a next hop in a path from the RN 5 to the RN 9 is the RN 7.

If a node determines that routing information of the node includes not only the identifier of the target node RN 7 but also the identifier of the source node RN 8 and the identifier of the switching node RN 9, it indicates that the node is a core node, for example, the RN 3. The RN 3 does not need to continue to send "the RN 9 leaves the RN 8 and joins the RN 7" to a parent node RN 1 of the RN 3, but sends a message to a child node (a child node connected to the core node in a path in which the RN 9 before switching is located) RN 6 of the RN 3 to indicate "the RN 9 leaves". The message "the RN 9 leaves" may carry the identifier of the switching node RN 9. Further, the RN 3 updates routing information of the RN 3 based on "the RN 9 leaves the RN 8 and joins the RN 7". Specifically, the RN 3 adds routing information "RN9→RN5, which means that a next hop in a new path from the RN 3 to the RN 9 is the RN 5. The RN 3 deletes routing information "RN9→RN6", which means that a next hop in an old path from the RN 3 to the RN 9 is the RN 6. "RN9→RN5" is routing information of the new path to the RN 9, and "RN9→RN6" is routing information of the old path to the RN 9.

Up to now, all nodes that need to add routing information have updated routes. Then nodes that need to delete routing information update routes. The RN 3 indicates "the RN 9 leaves" to a corresponding child node. "A corresponding child node" is a child node in the path in which the RN 9 before switching is located, and may be considered as a next hop to the RN 9 before switching in the path from the RN 3 to the RN 9, for example, the RN 6.

When the RN 6 receives the message "the RN9 leaves" sent by the RN 3, the RN 6 determines whether routing information of the RN 6 includes the identifier of the switching node RN 9 and whether the routing information of the RN 6 includes "directly connected to the RN 9"; and if the routing information of the RN 6 includes the identifier of the switching node but does not include "directly connected to the RN 9", the RN 6 sends a message to a child node of the RN 6 to indicate "the RN 9 leaves", for example, to the RN 8. Each node receiving a message sent by a parent node of the node determines whether routing information of the node includes the identifier of the switching node RN 9 and determines whether the routing information of the node includes "directly connected to the RN 9"; and if the identifier of the switching node RN 9 and "directly connected to the RN 9" are included, the node sends a message to a child node of the node to indicate "the RN 9 leaves"; or if the identifier of the switching node RN 9 is included but "directly connected to the RN 9" is not included, the node stops sending. For example, the RN 6 and the RN 8 may both update their routing information based on the received message ("the RN 9 leaves"). For example, the RN 6 deletes information RN9→RN8, which means that a next hop from the RN 6 to the RN 9 is the RN 8. The RN 8 deletes information "directly connected to the RN 9".

Figure 5:
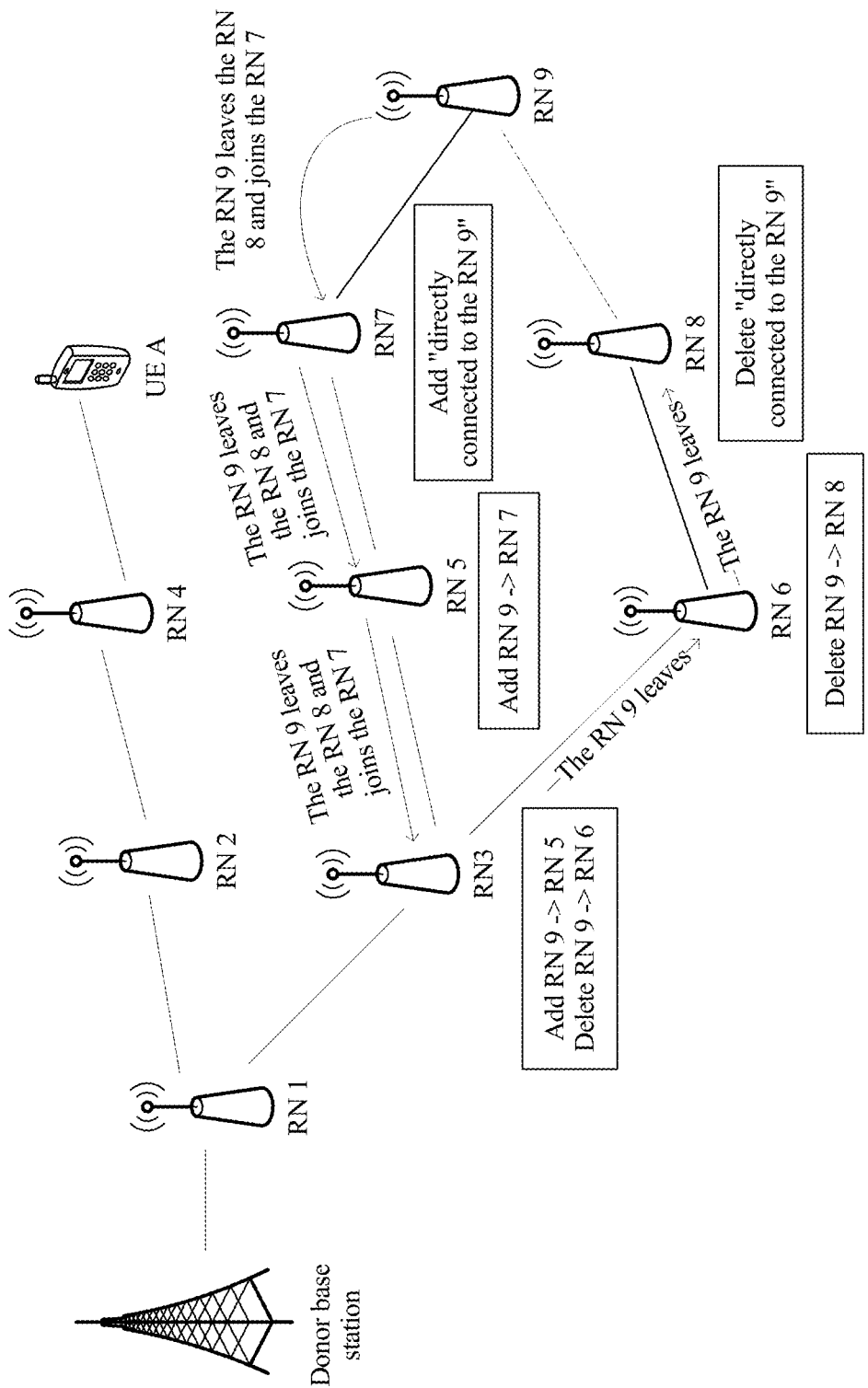
FIG. 5 is a schematic diagram of a route update method according to an embodiment of the present application.

In addition, although not shown in FIG. 5, the message sent by the RN 3 to the RN 6 may also be "the RN 9 leaves the RN 8", where the message may carry the identifier of the RN 9 and the identifier of the RN 8. The RN 6 may determine whether the identifier of the source node RN 8 in the received message is the same as the identifier of the RN 6; and if the identifiers are different, the RN 6 sends a message to the child node of the RN 6 to indicate "the RN 9 leaves the RN 8". Each node receiving "the RN 9 leaves the RN 8" sent by the parent node of the node, for example, the RN 6 or the RN 8, may determine whether the identifier of the source node RN 8 is the same as the identifier of the node; and if the identifiers are different, the node sends a message to the child node of the node to indicate "the RN 9 leaves the RN 8"; or if the identifiers are the same, the node stops sending.

Figure 6:
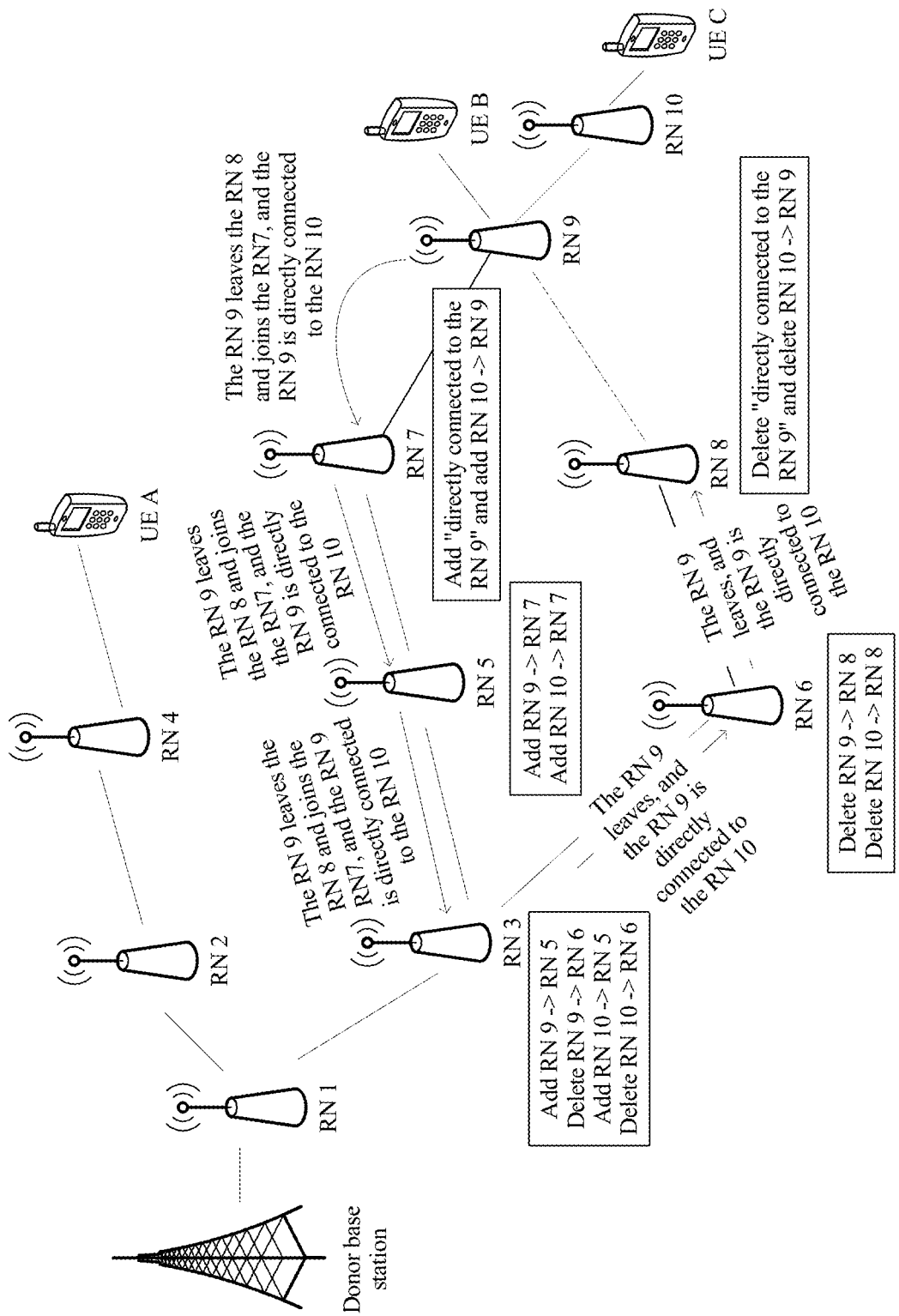
FIG. 6 is another schematic diagram of a route update method according to an embodiment of the present application.

In some embodiments, if another downstream node is further connected to the node that switches, when the node switches, the another node connected to the node may also switch. If the another node also switches when the node switches, the node may further send routing information of the node to the target node in addition to indicating "the switching node leaves the source node and accesses the target node" to the target node. For example, referring to FIG. 6, an RN 9 leaves an RN 8 and accesses an RN 7, and the RN 9 sends a message to the RN 7 to indicate "the RN 9 leaves the RN 8 and joins the RN 7", where the message needs to further include routing information of the RN 9. For example, the routing information of the RN 9 is "directly connected to an RN 10". Certainly, messages transferred between the target node, a first relay node, a core node, a second relay node, and the source node also need to include the routing information of the switching node. As shown in FIG. 6, a message sent by the RN 7 to an RN 5 includes the routing information "directly connected to the RN 10" of the RN 9; a message sent by the RN 5 to an RN 3 includes the routing information "directly connected to the RN 10" of the RN 9; a message sent by the RN 3 to an RN 6 includes the routing information "directly connected to the RN 10" of the RN 9; and a message sent by the RN 6 to the RN 8 includes the routing information "directly connected to the RN 10" of the RN 9.

Although not shown in FIG. 6, the message sent by the RN 3 to the RN 6 may also be "the RN 9 leaves the RN 8", where the message may carry an identifier of the RN 9 and an identifier of the RN 8. The RN 6 may determine whether the identifier of the source node RN 8 in the received message is the same as an identifier of the RN 6; and if the identifiers are different, the RN 6 sends a message to a child node of the RN 6 to indicate "the RN 9 leaves the RN 8". Each node receiving "the RN 9 leaves the RN 8" sent by a parent node of the node, for example, the RN 6 or the RN 8, may determine whether the identifier of the source node RN 8 is the same as an identifier of the node; and if the identifiers are different, the node sends a message to a child node of the node to indicate "the RN 9 leaves the RN 8"; or if the identifiers are the same, the node stops sending the message indicating "the RN 9 leaves the RN 8".

In some embodiments, the message sent by the switching node to the target node may be different from the example shown in FIG. 5, and the message may indicate only that the switching node accesses the target node. Specifically, the message includes an identifier of the switching node and an identifier of the target node.

Figure 7:
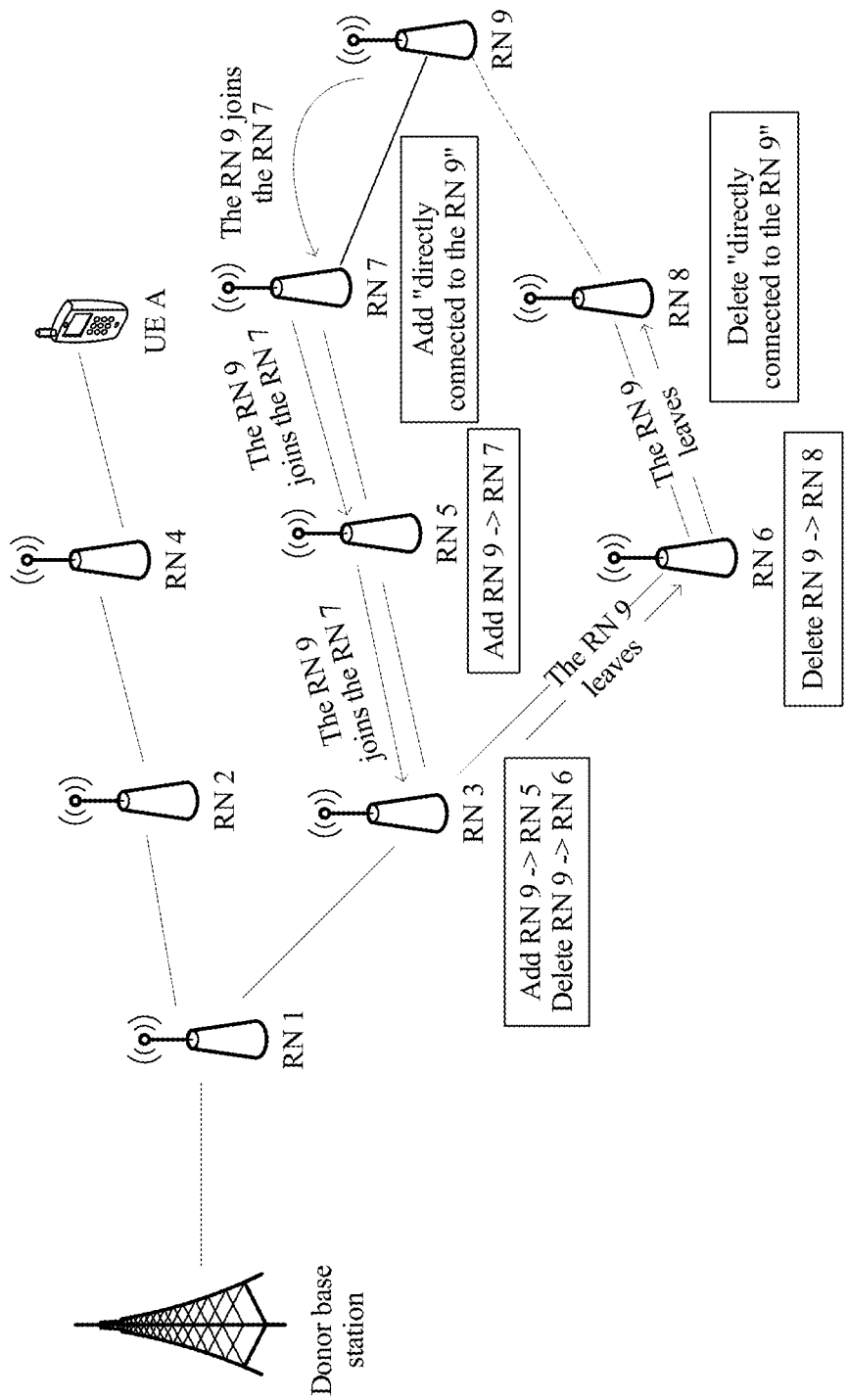
FIG. 7 is another schematic diagram of a route update method according to an embodiment of the present application.

Specifically, referring to FIG. 7, when an RN 9 leaves an RN 8 and joins an RN 7, the RN 9 sends a message to the target node RN 7 to indicate "the RN 9 joins the RN 7", where the message may carry an identifier of the RN 9 and an identifier of the RN 7.

Each node (RN) determines, based on a received message and a routing information table of the node, how to send a message to indicate node switching. Specifically, if a node determines that the identifier of the target node RN 7 in a received message is the same as an identifier of the node, that is, the node is the target node RN 7, the RN 7 sends a message to a parent node RN 5 of the RN 7 to indicate "the RN 9 joins the RN 7". Alternatively, the target node RN 7 itself learns that the switching node accesses the RN 7, and learns the identifier of the switching node RN 9 based on the received message. In this case, the target node RN 7 sends a message "the RN 9 joins the RN 7" to a parent node RN 5 of the RN 7.

If a node determines that routing information of the node includes only the identifier of the target node but does not include the identifier of the switching node and an identifier of the source node, it indicates that the node is a first relay node, for example, the RN 5. The RN 5 needs to continue to send "the RN 9 joins the RN 7" to a parent node RN 3 of the RN 5. The RN 5 may further update a routing information table of the RN 5 based on the message, and specifically, add information "RN9→RN7", which means that a next hop in a path from the RN 5 to the RN 9 is the RN 7.

If a node determines that routing information of the node includes not only the identifier of the target node RN 7 but also the identifier of the switching node RN 9, it indicates that the node is a core node, for example, the RN 3. The RN 3 does not need to continue to send "the RN 9 joins the RN 7" to a parent node RN 1 of the RN 3, but sends a message to a child node (a child node connected to the core node in a path in which the RN 9 before switching is located) RN 6 of the RN 3 to indicate "the RN 9 leaves", where the message carries the identifier of the switching node RN 9. It should be noted that, the RN 3 needs to search routing information of the RN 3 to determine a next hop from the RN 3 to the switching node RN 9, and send "the RN 9 leaves" to the next hop. For example, the routing information of the RN 3 includes "RN9→RN6", which means that a next hop from the RN 3 to the switching node RN 9 is the RN 6. In this case, the RN 3 sends a message to the RN 6 to indicate "the RN 9 leaves". In addition, the RN 3 updates the routing information of the RN 3 based on the message. Specifically, the RN 3 adds information "RN9→RN5", which means that a next hop in a path from the RN 3 to the RN 9 is the RN 5. The RN 3 deletes information "RN9→RN6", which means that a next hop in a path from the RN 3 to the RN 9 is the RN 6.

Up to now, all nodes that need to add routing information have updated routes. Then nodes that need to delete routing information update routes. The RN 3 indicates "the RN 9 leaves" to a corresponding child node, where "a corresponding child node" is a child node in the path in which the RN 9 before switching is located, and may be considered as a next hop to the RN 9 before switching in the path from the RN 3 to the RN 9, for example, the RN 6.

When the RN 6 receives the message sent by the RN 3 and indicating "the RN9 leaves", the RN 6 determines whether routing information of the RN 6 includes the identifier of the switching node RN 9 and whether the routing information of the RN 6 includes "directly connected to the RN 9"; and if the identifier of the switching node RN 9 is included but "directly connected to the RN 9" is not included, the RN 6 sends a message to a child node of the RN 6 to indicate "the RN 9 leaves", for example, to the RN 8. Each node receiving a message sent by a parent node of the node, for example, the RN 6 or the RN 8, determines whether routing information of the node includes the identifier of the switching node RN 9 and "directly connected to the switching node RN 9"; and if the identifier of the switching node RN 9 is included but "directly connected to the switching node RN 9" is not included, the node sends a message to a child node of the node to indicate "the RN9 leaves"; or if the identifier of the switching node RN 9 and "directly connected to the switching node RN 9" are included, the node stops sending the message indicating "the RN9 leaves". Further, both the RN 6 and the RN 8 may further update their routing information based on the received message (indicating "the RN 9 leaves"). For example, the RN 6 deletes information RN9→RN8, which means that a next hop from the RN 6 to the RN 9 is the RN 8. The RN 8 deletes information "directly connected to the RN 9".

In some embodiments, if another downstream node is further connected to the node that switches, when the node switches, the another node connected to the node may also switch. If the another node also switches when the node switches, the switching node may further send routing information of the switching node to the target node in addition to indicating "the switching node leaves the source node and accesses the target node" to the target node. For example, refer to a similar method shown in FIG. 6. Details are not described again herein.

With reference to the accompanying drawings, the following describes a route update method provided by an embodiment of the present application. Specifically, nodes that need to delete routing information first update routes. After the nodes delete the routing information, nodes that need to add routing information update their routing information. For example, referring to FIG. 8, when an RN 9 leaves an RN 8 and joins an RN 7, the RN 9 sends a message to the source node RN 8 to indicate "the RN 9 joins the RN 7", where the message may carry an identifier of the RN 9 and an identifier of the RN 7.

Each node (RN) determines, based on a received message and a routing information table of the node, how to send a message to indicate node switching. Specifically, the source node learns that the switching node switches and leaves the source node. If the source node RN 8 receives the message indicating "the RN 9 joins the RN 7", the RN 8 sends a message to a parent node RN 6 of the RN 8 to indicate "the RN 9 leaves the RN 8 and joins the RN 7". Optionally, the message sent by the RN 9 to the source node RN 8 may further indicate "the RN 9 leaves the RN 8 and joins the RN 7". If the source node determines that an identifier of the source node RN 8 in the received message is the same as an identifier of the source node, the RN 8 sends a message to the parent node RN 6 of the RN 8 to indicate "the RN 9 leaves the RN 8 and joins the RN 7". If a node determines that routing information of the node does not include the identifier of the target node RN 7, it indicates that the node is a second relay node, for example, the RN 6. The RN 6 needs to continue to send "the RN 9 leaves the RN 8 and joins the RN 7" to a parent node RN 3 of the RN 6. The RN 6 may further update a routing information table of the RN 6 based on the message, and specifically, delete information "RN9→RN8", which means that a next hop in a path from the RN 6 to the RN 9 is the RN 8.

If a node determines that routing information of the node includes the identifier of the target node RN 7, it indicates that the node is a core node, such as the RN 3. The RN 3 does not need to continue to send "the RN 9 leaves the RN 8 and joins the RN 7" to a parent node RN 1 of the RN 3, but sends a message to a child node (a child node connected to the core node in a path in which the RN 9 after switching is located) RN 5 of the RN 3 to indicate "the RN 9 joins the RN 7". The message may carry the identifier of the RN 9 and the identifier of the RN 7. The RN 3 updates routing information of the RN 3 based on "the RN 9 leaves the RN 8 and joins the RN 7". Specifically, the RN 3 adds information "RN9→RN5, which means that a next hop in a path from the RN 3 to the RN 9 is the RN 5. The RN 3 deletes information "RN9→RN6", which means that a next hop in a path from the RN 3 to the RN 9 is the RN 6.

Up to now, all nodes that need to delete routing information have updated routes. Then nodes that need to add routing information update routes. The RN 3 indicates "the RN 9 joins the RN 7" to a corresponding child node. "A corresponding child node" is a child node in the path in which the RN 9 after switching is located, and may be considered as a next hop to the RN 9 after switching in the path from the RN 3 to the RN 9, for example, the RN 5.

When the RN 5 receives the message sent by the RN 3 and indicating "the RN 9 joins the RN 7", the RN 5 determines whether the identifier of the target node RN 7 in the received message is the same as an identifier of the RN 5; and if the identifiers are different, the RN 5 sends a message to a child node of the RN 5 to indicate "the RN 9 joins the RN 7", for example, to the RN 7. Each node (for example, the RN 5 or the RN 7) receiving a message sent by a parent node of the node determines whether the identifier of the target node RN 7 in the message is the same as an identifier of the node; and if the identifiers are different, the node sends a message to a child node of the node to indicate "the RN 9 joins the RN 7"; or if the identifiers are the same, the node stops sending. The RN 5 and the RN 7 may both update their routing information based on the received message ("the RN 9 joins the RN 7"). For example, the RN 5 adds information RN9→RN7, which means that a next hop from the RN 5 to the RN 9 is the RN 7. The RN 7 adds information "directly connected to the RN 9".

Figure 9:
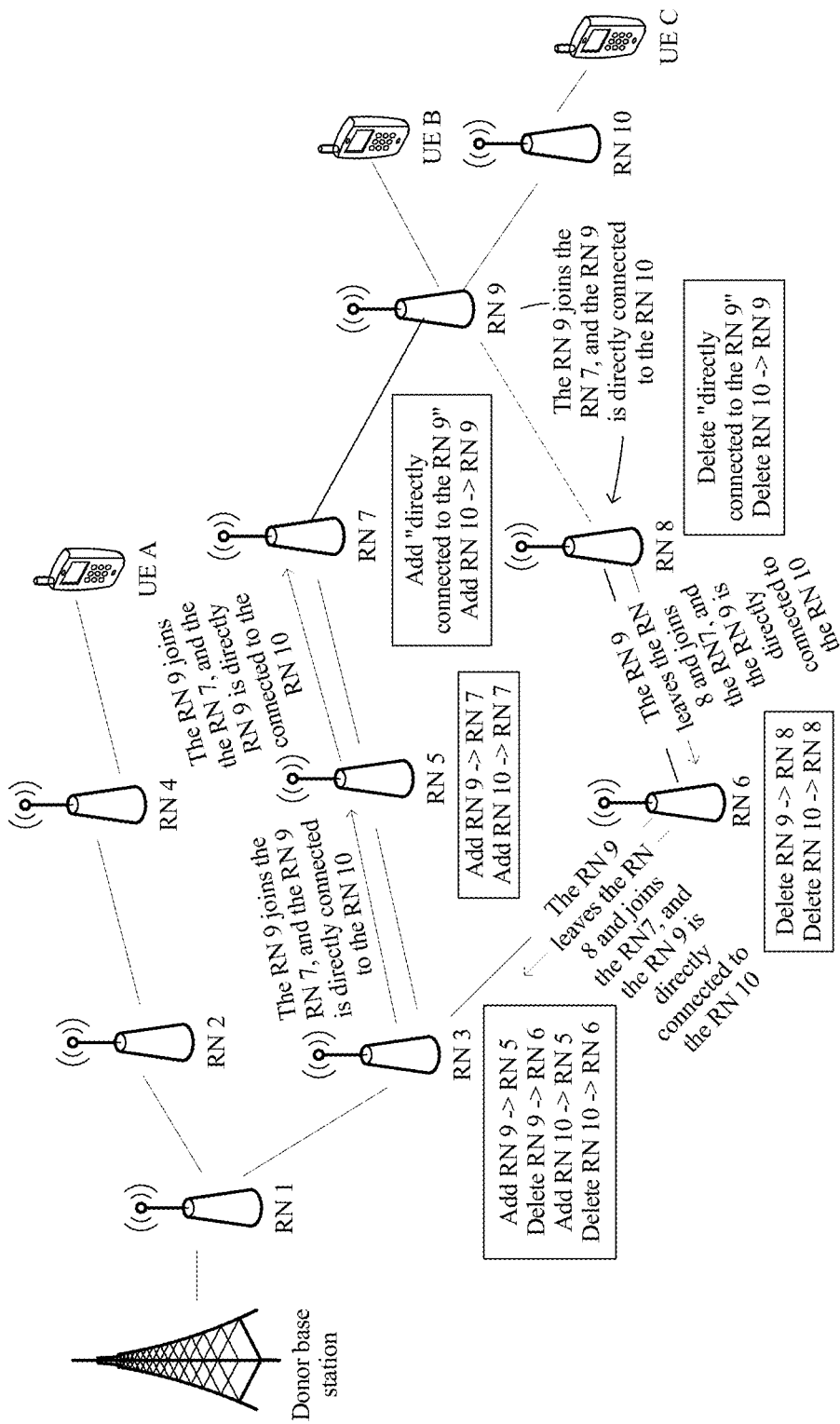
FIG. 9 is another schematic diagram of a route update method according to an embodiment of the present application.

In some embodiments, if another downstream node is further connected to the node that switches, when the node switches, the another node connected to the node may also switch. If the another node also switches when the node switches, the switching node may further send routing information of the switching node to the target node in addition to indicating "the switching node accesses the target node" to the source node. For example, referring to FIG. 9, an RN 9 leaves an RN 8 and accesses an RN 7, and the RN 9 sends a message to the RN 8 to indicate "the RN 9 leaves the RN 8 and joins the RN 7", where the message needs to further include routing information of the RN 9. For example, the routing information of the RN 9 is "directly connected to an RN 10". Certainly, messages transferred between the target node, a first relay node, a core node, a second relay node, and the source node also need to include the routing information of the switching node RN 9. As shown in FIG. 9, a message sent by the RN 8 to an RN 6 includes the routing information "directly connected to the RN 10" of the RN 9; a message sent by the RN 6 to an RN 3 includes the routing information "directly connected to the RN 10" of the RN 9; a message sent by the RN 3 to an RN 5 includes the routing information "directly connected to the RN 10" of the RN 9; and a message sent by the RN 5 to the RN 7 includes the routing information "directly connected to the RN 10" of the RN 9.

Figure 8:
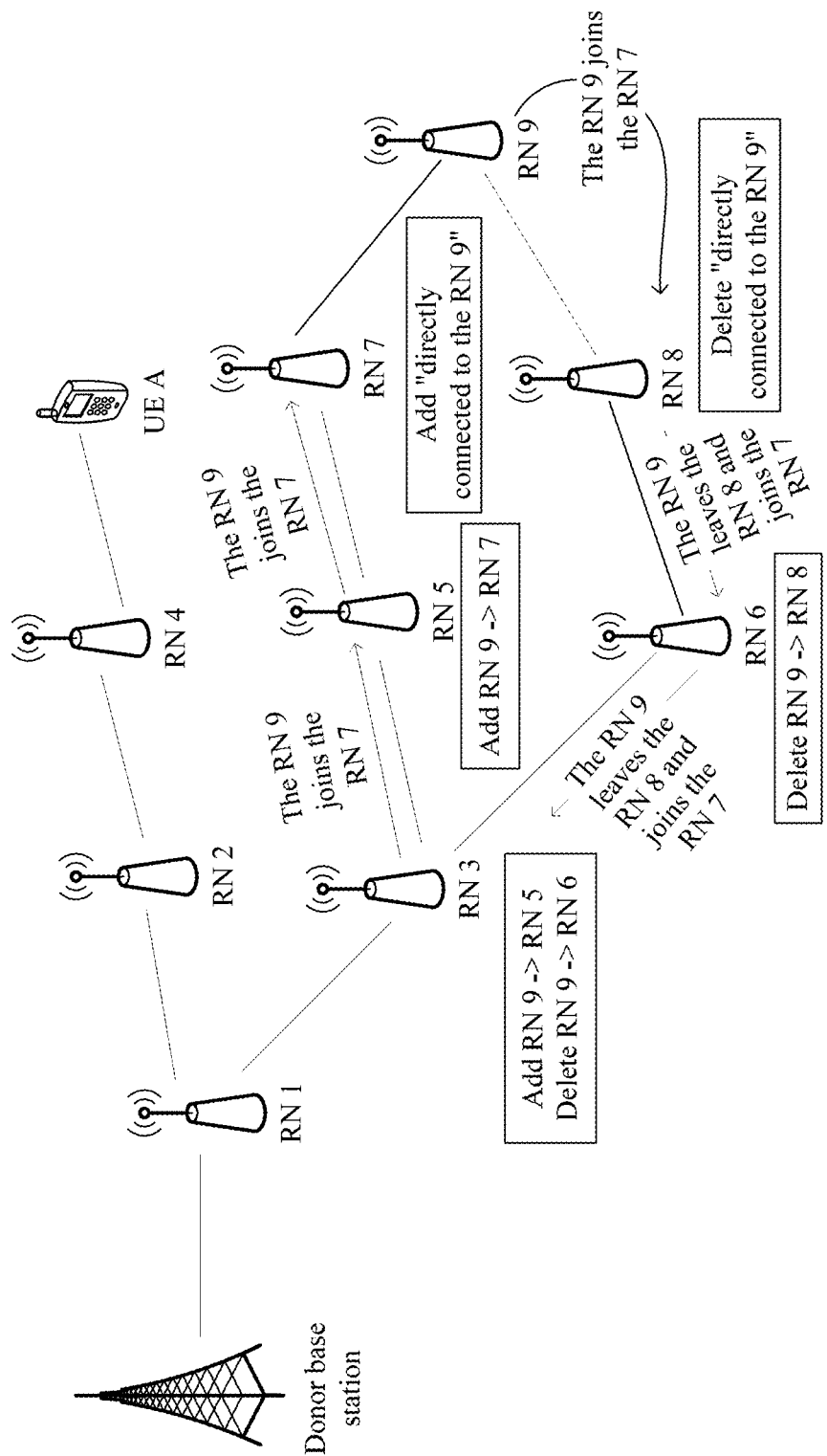
FIG. 8 is another schematic diagram of a route update method according to an embodiment of the present application.

In some embodiments, the message sent by the switching node RN 9 to the source node RN 8 may be different from the example shown in FIG. 8, and the message may indicate only that the switching node accesses the target node. Specifically, referring to FIG. 10, when an RN 9 leaves an RN 8 and joins an RN 7, the RN 9 sends "the RN 9 joins the RN 7" to the source node RN 8. The message may carry an identifier of the RN 9 and an identifier of the RN 7.

Each node (RN) determines, based on a received message and a routing information table of the node, how to send a message to indicate node switching. Specifically, the source node learns that the switching node switches and leaves the source node. If the source node RN 8 receives the message indicating "the RN 9 joins the RN 7", the RN 8 sends a message to a parent node RN 6 of the RN 8 to indicate "the RN 9 joins the RN 7".

If a node determines that routing information of the node does not include the identifier of the target node RN 7, it indicates that the node is a second relay node, for example, the RN 6. The RN 6 needs to continue to send "the RN 9 joins the RN 7" to a parent node RN 3 of the RN 6. The RN 6 may further update a routing information table of the RN 6 based on the message, and specifically, delete information "RN9→RN 8", which means that a next hop in a path from the RN 6 to the RN 9 is the RN 8.

If a node determines that routing information of the node includes the identifier of the target node RN 7, it indicates that the node is a core node, such as the RN 3. The RN 3 does not need to continue to send "the RN 9 joins the RN 7" to a parent node RN 1 of the RN 3, but sends a message to a child node (a child node connected to the core node RN 3 in a path in which the RN 9 after switching is located) RN 5 of the RN 3 to indicate "the RN 9 joins the RN 7". The RN 3 updates routing information of the RN 3 based on the message. Specifically, the RN 3 adds information "RN9→RN5", which means that a next hop in a path from the RN 3 to the RN 9 is the RN 5. The RN 3 deletes information "RN9→RN6", which means that a next hop in a path from the RN 3 to the RN 9 is the RN 6.

Up to now, all nodes that need to delete routing information have updated routes. Then nodes that need to add routing information update routes. The RN 3 indicates "the RN 9 joins the RN 7" to a corresponding child node. "A corresponding child node" is a child node in the path in which the RN 9 after switching is located, and may be considered as a next hop to the RN 9 after switching in the path from the RN 3 to the RN 9, for example, the RN 5.

When the RN 5 receives the message sent by the RN 3 and indicating "the RN 9 joins the RN 7", the RN 5 determines whether the identifier of the target node RN 7 in the received message is the same as an identifier of the RN 5; and if the identifiers are different, the RN 5 sends a message to a child node of the RN 5 to indicate "the RN 9 joins the RN 7", for example, to the RN 7. Each node (for example, the RN 5 or the RN 7) receiving a message sent by a parent node of the node determines whether the identifier of the target node RN 7 is the same as an identifier of the node; and if the identifiers are different, the node sends a message to a child node of the node to indicate "the RN 9 joins the RN 7"; or if the identifiers are the same, the node stops sending. The RN 5 and the RN 7 may both update their routing information based on the received message ("the RN 9 joins the RN 7"). For example, the RN 5 adds information RN9→RN7, which means that a next hop from the RN 5 to the RN 9 is the RN 7. The RN 7 adds information "directly connected to the RN 9".

Figure 10:
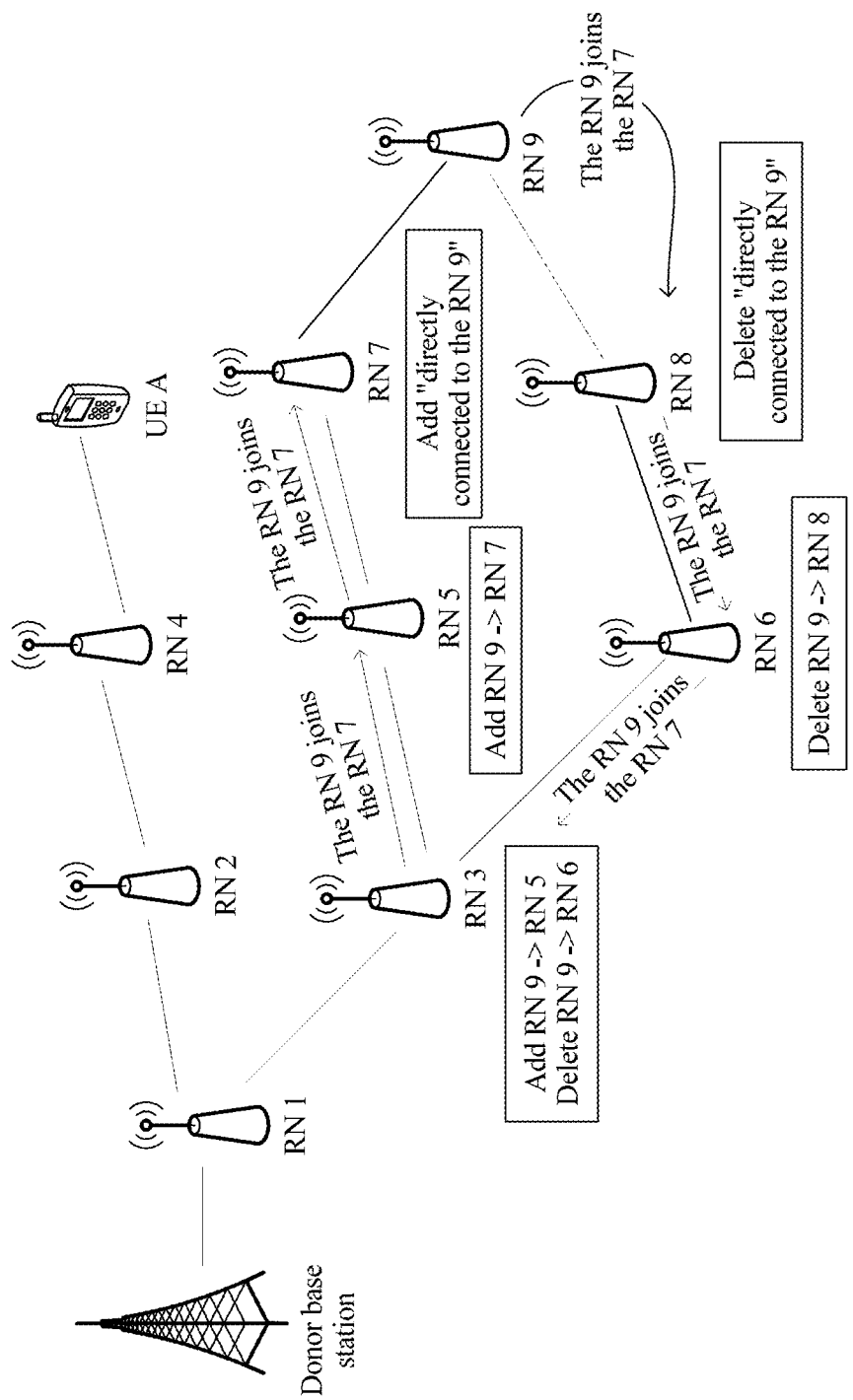
FIG. 10 is another schematic diagram of a route update method according to an embodiment of the present application.

Although not shown in FIG. 8 to FIG. 10, the message sent by the switching node RN 9 to the source node RN 8 may also be "the RN 9 leaves, and the RN 9 accesses the RN 7", and the message may carry the identifier of the RN 9 and the identifier of the RN 7. The RN 8 may determine whether routing information of the RN 8 includes the identifier of the target node RN 7; and if the routing information of the RN 8 does not include the identifier of the target node RN 7, the RN 8 sends a message to the parent node RN 6 of the RN 8 to indicate "the RN 9 leaves, and the RN 9 accesses the RN 7". The RN 6 may determine whether routing information of the RN 6 includes the identifier of the target node RN 7; and if the routing information of the RN 6 does not include the identifier of the target node RN 7, the RN 8 sends a message to the parent node RN 3 of the RN 8 to indicate "the RN 9 leaves, and the RN 9 accesses the RN 7". If the RN 3 determines that the routing information of the RN 3 includes the identifier of the RN 7, the RN 3 sends a message "the RN 9 accesses the RN 7" to a child node RN 5 of the RN 3, where the message may carry the identifier of the RN 9 and the identifier of the RN 7. The RN 5 receives the message sent by the RN 3, and if determining that the identifier of the RN 5 is different from the identifier of the target node RN 7, sends a message to a child node RN 7 of the RN 5 to indicate "the RN 9 accesses the RN 7". The RN 7 receives the message sent by the RN 5, and if determining that the identifier of the RN 7 is the same as the identifier of the target node RN 7, stops sending a message indicating "the RN 9 accesses the RN 7".

In some embodiments, if another downstream node is further connected to the node that switches, when the node switches, the another node connected to the node may also switch. If the another node also switches when the node switches, the switching node may further send routing information of the switching node to the target node in addition to indicating "the switching node accesses the target node" to the source node. For example, refer to a similar method shown in FIG. 9. Details are not described again herein.

The foregoing mainly describes solutions provided in embodiments of this application from a perspective of interaction between the nodes. It may be understood that, a route update apparatus includes a corresponding hardware structure and/or software module for performing each function, to implement the foregoing function. A person skilled in the art should be easily aware that the algorithm steps in the examples described with reference to the embodiments disclosed in this specification can be implemented in a form of hardware or a combination of hardware and computer software in this application. Whether a function is implemented by hardware or in a manner of driving hardware by computer software depends on a particular application and a design constraint of the technical solution. A person skilled in the art may use different methods to implement the described functions for each particular application, but it should not be considered that the implementation goes beyond the scope of this application.

In the embodiments of this application, functional module division may be performed on the network device based on the foregoing examples in the method. For example, various functional modules may be divided based on various corresponding functions, or two or more functions may be integrated into one processing module. The integrated module may be implemented in a form of hardware, or may be implemented in a form of a functional module of software. It should be noted that module division in embodiments of this application is an example and is merely logical function division. During actual implementation, there may be another division manner.

Figure 11:
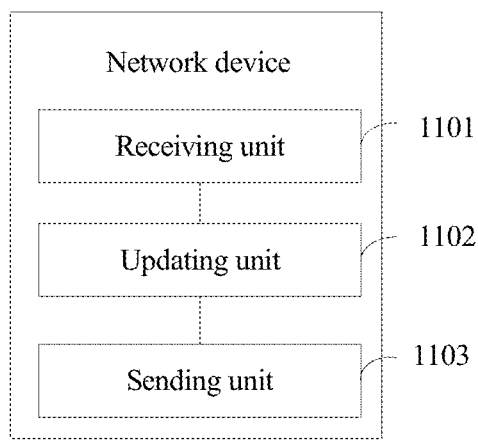
FIG. 11 is another structural block diagram of a network device according to an embodiment of the present application.

When various functional modules are divided based on various corresponding functions, an embodiment of the present application provides a communications device. The communications device may be a first node, a second node, or a third node used in this embodiment of the present application. When various functional modules are divided based on various corresponding functions, FIG. 11 is a possible schematic structural diagram of the communications device. As shown in FIG. 11, the network device includes a receiving unit 1101, an updating unit 1102, and a sending unit 1103.

The receiving unit 1101 is configured to support the network device in performing step 401 in the foregoing embodiment, and/or is used in other processes of the technology described in this specification.

The updating unit 1102 is configured to support the network device in performing step 402 in the foregoing embodiment, and/or is used in other processes of the technology described in this specification.

The sending unit 1103 is configured to support the network device in sending a message to another node. For example, when the network device is used as a first node, the sending unit 1103 is configured to support the first node in sending a second message to a third node, and/or is used in other processes of the technology described in this specification.

It should be noted that all related content of the steps in the method embodiments can be cited to the descriptions of functions of the corresponding functional modules, and details are not described again herein.

Figure 12:
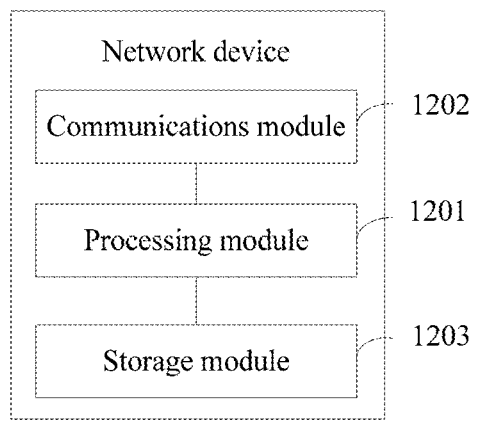
FIG. 12 is another structural block diagram of a network device according to an embodiment of the present application.

For example, when an integrated unit is used, a schematic structural diagram of a network device according to an embodiment of the present application is shown in FIG. 12. In FIG. 12, the network device includes a processing module 1201 and a communications module 1202. The processing module 1201 is configured to control and manage actions of the network device, for example, perform a step performed by the updating unit 1102, and/or configured to perform other processes of the technology described in this specification. The communications module 1202 is configured to support the network device in interacting with other devices, for example, perform steps performed by the receiving unit 1101 and the sending unit 1103. As shown in FIG. 12, the network device may further include a storage module 1203, where the storage module 1203 is configured to store program code and data of the network device.

When the processing module 1201 is a processor, and the communications module 1202 is a transceiver, and the storage module 1203 is a memory, the network device may be the network device shown in FIG. 3. If the transceiver is a receiver and a transmitter, the receiver performs the step performed by the receiving unit 1101, and the transmitter performs the step performed by the sending unit 1103.

Embodiments of this application are applied to a 5G communications system or other systems that may emerge in the future. The following explains and describes some terms in this application for ease of understanding by a person skilled in the art. It should be noted that, when solutions in embodiments of this application are applied to a 5G system or other systems that may emerge in the future, names of a network device and a user equipment may change, but this does not affect implementation of solutions in embodiments of this application.

(1) User equipment (UE), also referred to as a user or user equipment, is a device providing voice and/or data connectivity for a user, for example, a hand-held device or an in-vehicle device that has a wireless connection function. Common user equipment, for example, includes a mobile phone, a tablet computer, a notebook computer, a palmtop computer, a mobile Internet device (MID), or a wearable device. The wearable device, for example, includes a smartwatch, a smart band, or a pedometer.

(2) A network device, also referred to as a radio access network (RAN) device, is a device that connects the user equipment to a wireless network. The network device includes network devices in various communications standards, for example, including but not limited to a base station, an evolved NodeB (eNB), a radio network controller (RNC), a NodeB (NB), a base station controller (BSC), a base transceiver station (BTS), a home network device (for example, a Home evolved NodeB, or a Home NodeB, HNB), or a baseband unit (BBU). In addition, the network device includes network devices in various frequency standards, for example, including but not limited to a low-frequency network device or a high-frequency network device.

In the prior art, a user equipment notifies, by using buffer status reporting (BSR), a network device (such as a base station) of an amount of data to be sent in an uplink buffer of the user equipment, so that the network device determines a quantity of uplink resources to be allocated to the UE. When the user equipment triggers a regular buffer status report (Regular BSR), and there is no available uplink resource currently, the UE triggers a scheduling request (SR) to notify the network device that the UE has data to be sent. The network device allocates to the UE an uplink resource that is at least sufficient for sending the BSR, and the UE sends the BSR to the network device by using the uplink resource. With respect to an SR cancellation condition, when either of the following two conditions is satisfied, an SR in a pending state is canceled: condition 1: a medium access control (MAC) protocol data unit (PDU) has been assembled and includes a BSR, and the BSR includes a buffer status up to the last event that triggers a BSR; and condition 2: a MAC PDU to be transmitted includes all pending data available for transmission. With respect to a BSR cancellation condition, when either of the following two conditions is satisfied, a triggered BSR may be canceled: condition 1: when a MAC PDU to be transmitted has been assembled and includes a BSR, the triggered BSR is canceled; and condition 2: when a MAC PDU to be transmitted includes all pending data available for transmission but is not sufficient to additionally accommodate a BSR MAC control element (CE) plus its header, the triggered BSR may be canceled.

In a 5th Generation (5G) new radio (NR) system, when the user equipment receives, on a physical downlink control channel (PDCCH) resource, downlink scheduling information (DCI) sent by the network device, the downlink scheduling information indicates an uplink grant (UL grant), and also indicates a time after which the indicated uplink grant can be used to send uplink data, starting from current reception of the downlink scheduling information. For example, if the downlink control information indicates a value K, it indicates that the indicated uplink grant can be used to send the uplink data after a time K after the downlink control information is received. The uplink data is sent on a physical uplink shared channel (PUSCH) resource. After receiving the downlink scheduling information, the user equipment may start to perform assembly, that is, assemble a medium access control (MAC) protocol data unit (PDU). In addition, the assembly is completed before the uplink grant arrives, so that the assembled MAC PDU is sent successfully by using the indicated uplink grant. The user equipment may perform assembly at any time in the time K. This depends on implementation of the user equipment. When the user equipment finishes the assembly of the MAC PDU, it may be possible that a time for using the uplink grant has not arrived, that is, a time when a physical uplink shared channel resource appears has not arrived. In this case, the assembled MAC PDU can be sent by using the indicated uplink grant after a period of time. For example, after the MAC PDU is assembled, the MAC PDU can be sent by using the indicated uplink grant after a time R. To be specific, within the time R, because an SR has been canceled, even if a physical uplink control channel (PUCCH) resource on which the SR can be sent appears, the SR cannot be sent, so the base station can learn, only when the MAC PDU is sent after the time R, that the user equipment has buffered data to be sent. To be specific, the base station cannot learn, based on an earlier SR, that the user equipment has buffered data to be sent. Consequently, scheduling the uplink data of the user equipment earlier by the base station may be affected, and a latency of the uplink data of the user equipment is caused to increase.

Figure 13:
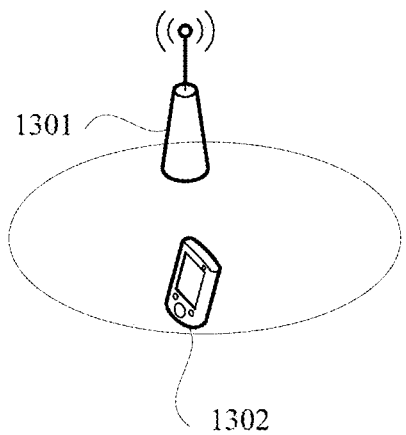
FIG. 13 is a schematic diagram of an application scenario according to an embodiment of this application.

FIG. 13 is a schematic diagram of an application scenario according to an embodiment of this application. A networking architecture shown in FIG. 13 mainly includes a network device 1301 and user equipment 1302. The user equipment 1302 may communicate with the network device 1301. Data sent by the user equipment 1302 to the network device 1301 is uplink data. Data sent by the network device 1301 to the user equipment 1302 is downlink data. An uplink resource (for example, a time-frequency resource) used by the user equipment 1302 for sending the uplink data is configured by the network device 1301 through persistent scheduling, semi-persistent scheduling, dynamic scheduling, or the like. In this embodiment of the present application, the user equipment 1302 notifies, by using a BSR, the network device 1301 (such as a base station) of an amount of uplink data that the user equipment device 1302 needs to send, so that the network device 1301 determines a quantity of uplink resources to be allocated to the user equipment 1302. Before sending the BSR, the user equipment 1302 may have sent an SR to the network device 1301 to notify the network device 1301 that the user equipment 1302 has data to be sent, so that the network device 1301 allocates an uplink resource that is at least sufficient for sending the BSR. The user equipment 1302 uses the uplink resource to send the BSR to the network device 1301.

Figure 14:
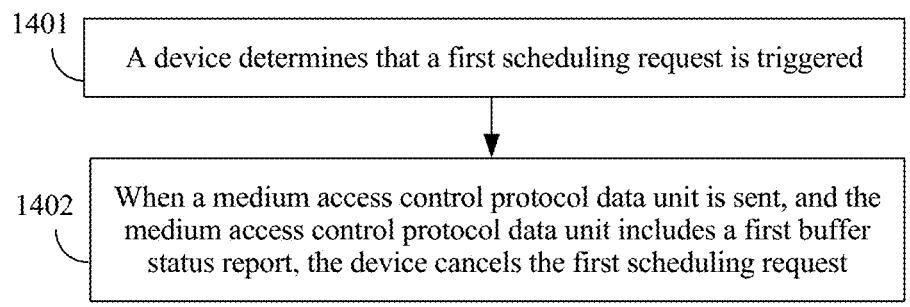
FIG. 14 is a flowchart of a scheduling request cancellation method according to an embodiment of the present application.

FIG. 14 is a schematic flowchart of a scheduling request cancellation method according to an embodiment of the present application. The method includes but is not limited to the following steps.

Step 1401: A device determines that a first scheduling request is triggered.

Specifically, the device may be a terminal device. When a trigger condition for triggering the scheduling request is satisfied, the scheduling request is triggered. "A device determines that a first scheduling request is triggered" may be understood as "the device learns that the triggered first scheduling request exists". In this case, the first scheduling request is a pending scheduling request, or it may be understood that the first scheduling request is a scheduling request that is triggered and not canceled.

Step 1402: When a medium access control protocol data unit is sent, and the medium access control protocol data unit includes a first buffer status report, the device cancels the first scheduling request.

Specifically, when the device receives an uplink resource allocated by a network device, the device assembles to-be-transmitted data into a MAC PDU, and the MAC PDU may include a buffer status report. When the assembled MAC PDU is sent, and the MAC PDU includes the first buffer status report, it is considered that a condition for canceling the first scheduling request is satisfied. In this case, the device cancels the pending first scheduling request. The first buffer status report includes a first buffer status, where the first buffer status is a buffer status up to the last event that triggers a buffer status report. For example, before the MAC PDU is sent, an event 1 triggers a buffer status report at a time 1, which corresponds to a buffer status 1; after the time 1 and before the MAC PDU is sent, an event 2 triggers a buffer status report at a time 2, which corresponds to a buffer status 2; and before the MAC PDU is sent and after the event 2, no new event triggers a buffer status report. In this case, the first buffer status may be considered as the buffer status corresponding to the last event 2 at the time 2, that is, the first buffer status may be considered as the buffer status 2.

It should be noted that, a quantity of first scheduling requests may be one or more. "The device cancels the first scheduling request" may be understood as "the device cancels all first scheduling requests". "A medium access control protocol data unit is sent" may be considered as "at least one medium access control protocol data unit is sent". "The medium access control protocol data unit includes a first buffer status report" may be considered as "the medium access control protocol data unit includes at least one first buffer status report". This is not limited in the present application. "A medium access control protocol data unit is sent" may be that the medium access control protocol data unit starts to be sent, or may be that the medium access control protocol data unit has been sent. This is not limited in the present application.

In some embodiments, the first buffer status is a buffer status up to the last event that triggers a buffer status report prior to the medium access control protocol data unit assembly. To be specific, when the assembled MAC PDU is sent, and the MAC PDU includes the first buffer status report, where the first buffer status report includes the first buffer status, and the first buffer status is the buffer status up to the last event that triggers a buffer status report prior to the MAC PDU assembly, it is considered that the condition for canceling the first scheduling request is satisfied. In this case, the device cancels the pending first scheduling request. For example, before the MAC PDU is assembled, an event 1 triggers a buffer status report at a time 1, which corresponds to a buffer status 1; after the time 1 and before the MAC PDU is sent, an event 2 triggers a buffer status report at a time 2, which corresponds to a buffer status 2; and after the MAC PDU is assembled and before the MAC PDU is sent, an event 3 triggers a buffer status report at a time 3, which corresponds to a buffer status 3. In this case, the first buffer status may be considered as the buffer status corresponding to the last event 2 at the time 2 before the MAC PDU is assembled, that is, the first buffer status may be considered as the buffer status 2. Optionally, the first buffer status is a buffer status up to an event that triggers the first buffer status report.

In some embodiments, further, the first scheduling request is a scheduling request triggered prior to the medium access control protocol data unit assembly. For example, before the MAC PDU is assembled, a scheduling request 1 is triggered; and after the MAC PDU is assembled and before the MAC PDU is sent, a scheduling request 2 is triggered. In this case, the first scheduling request may be considered as a scheduling request triggered prior to the MAC PDU assembly, that is, the scheduling request 1. Optionally, the first scheduling request is a scheduling request triggered by a second buffer status report, where the medium access control protocol data unit includes a buffer status that exists when an event triggers the second buffer status report. If a triggered buffer status report or scheduling request exists currently, the MAC PDU is assembled to include a buffer status report, and the buffer status report includes a latest buffer status at a current assembly time, that is, a buffer status up to the last event that triggers a buffer status report prior to the MAC PDU assembly, that is, the buffer status that exists when the event triggers the second buffer status report. Therefore, it may be considered that the second buffer status report is a buffer status report triggered prior to the MAC PDU assembly; the first scheduling request is a scheduling request triggered by the second buffer status report; and it may be considered that the first scheduling request is a scheduling request triggered prior to the MAC PDU assembly. It should be noted that, a quantity of first scheduling requests may be one or more. To be specific, all scheduling requests that are triggered prior to the MAC PDU assembly are first scheduling requests. "The device cancels the first scheduling request" may be understood as "the device cancels all first scheduling requests".

In some embodiments, the first buffer status report does not include a first buffer status, where the first buffer status is a buffer status up to the last event that triggers a buffer status report. It may also be understood that, the first buffer status report includes a second buffer status, where the second buffer status is not a buffer status up to the last event that triggers a buffer status report.

Specifically, further, the first scheduling request is a scheduling request triggered prior to the medium access control protocol data unit assembly. For example, before the MAC PDU is assembled, a scheduling request 1 is triggered; and after the MAC PDU is assembled and before the MAC PDU is sent, a scheduling request 2 is triggered. In this case, the first scheduling request may be considered as a scheduling request triggered prior to the MAC PDU assembly, that is, the scheduling request 1. Optionally, the first scheduling request is a scheduling request triggered by a second buffer status report, where the medium access control protocol data unit includes a buffer status that exists when an event triggers the second buffer status report. If a triggered buffer status report or scheduling request exists currently, the MAC PDU is assembled to include a buffer status report, and the buffer status report includes a latest buffer status at a current assembly time, that is, a buffer status up to the last event that triggers a buffer status report prior to the MAC PDU assembly, that is, the buffer status that exists when the event triggers the second buffer status report. Therefore, it may be considered that the second buffer status report is a buffer status report triggered prior to the MAC PDU assembly; the first scheduling request is a scheduling request triggered by the second buffer status report; and it may be considered that the first scheduling request is a scheduling request triggered prior to the MAC PDU assembly. It should be noted that, a quantity of first scheduling requests may be one or more. To be specific, all scheduling requests that are triggered prior to the MAC PDU assembly are first scheduling requests. "The device cancels the first scheduling request" may be understood as "the device cancels all first scheduling requests".

In some embodiments, the device may further stop a scheduling request prohibit timer of the first scheduling request. Each scheduling request may correspond to a scheduling request configuration, and each scheduling request configuration is associated with a scheduling request prohibit timer. Therefore, when a scheduling request corresponding to a scheduling request configuration is canceled, that is, no scheduling request corresponding to the scheduling request configuration is triggered, a scheduling request prohibit timer of the scheduling request needs to be stopped. Therefore, when the device cancels the first scheduling request, the device further needs to stop the scheduling request prohibit timer of the first scheduling request. It should be noted that, the quantity of first scheduling requests may be one or more. A plurality of scheduling requests may correspond to one or more scheduling request configurations. "The device cancels the first scheduling request" may be understood as "the device cancels all first scheduling requests". Stopping the scheduling request prohibit timer of the first scheduling request may be understood as stopping a scheduling request prohibit timer of each first scheduling request. If a plurality of scheduling requests correspond to one scheduling request configuration, a corresponding scheduling request prohibit timer is stopped. If a plurality of scheduling requests correspond to a plurality of scheduling request configurations, scheduling request prohibit timers corresponding to the scheduling requests are stopped.

Figure 15:
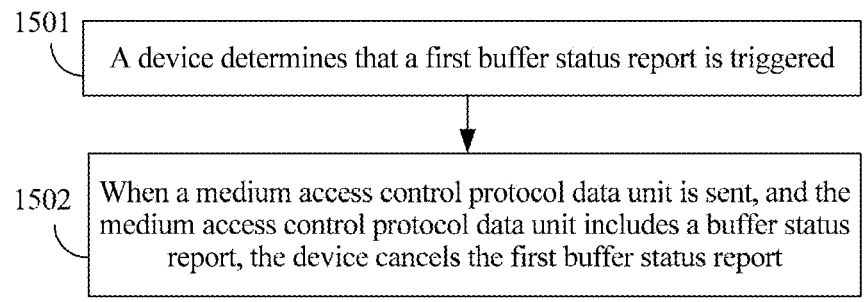
FIG. 15 is a flowchart of a buffer status report cancellation method according to an embodiment of the present application.

FIG. 15 is a schematic flowchart of a buffer status report cancellation method according to an embodiment of the present application. The method includes but is not limited to the following steps.

Step 1501: A device determines that a first buffer status report is triggered.

Specifically, the device may be a terminal device. When a trigger condition for triggering a buffer status report is satisfied, the buffer status report is triggered. "A device determines that a first buffer status report is triggered" may be understood as "the device learns that the triggered first buffer status report exists".

Step 1502: When a medium access control protocol data unit is sent, and the medium access control protocol data unit includes a buffer status report, the device cancels the first buffer status report.

Specifically, when the device receives an uplink resource allocated by a network device, the device assembles to-be-transmitted data into a MAC PDU, and the MAC PDU may include at least one buffer status report. When the assembled MAC PDU is sent, and the MAC PDU includes at least one buffer status report, it is considered that a condition for canceling the first buffer status report is satisfied. In this case, the device cancels the first buffer status report to be triggered.

It should be noted that, a quantity of first buffer status reports may be one or more. "The device cancels the first buffer status report" may be understood as "the device cancels all first buffer status reports". "A medium access control protocol data unit is sent" may be considered as "at least one medium access control protocol data unit is sent". "The medium access control protocol data unit includes a buffer status report" may be considered as "the medium access control protocol data unit includes at least one buffer status report". This is not limited in the present application. "A medium access control protocol data unit is sent" may be that the medium access control protocol data unit starts to be sent, or may be that the medium access control protocol data unit has been sent. This is not limited in the present application.

In some embodiments, the first buffer status report is a buffer status report triggered prior to the medium access control protocol data unit assembly. To be specific, when the assembled MAC PDU is sent, and the MAC PDU includes at least one buffer status report, it is considered that the condition for canceling the first buffer status report is satisfied. The first buffer status report is a buffer status report triggered prior to the MAC PDU assembly. In this case, the device cancels the triggered first buffer status report. For example, before the MAC PDU is assembled, a buffer status report 1 is triggered; and after the MAC PDU is assembled and before the MAC PDU is sent, a buffer status report 2 is triggered. In this case, the first buffer status report may be considered as a buffer status report triggered prior to the MAC PDU assembly, that is, the buffer status report 1. It should be noted that, a quantity of the first buffer status reports may be one or more. To be specific, all buffer status reports that are triggered prior to the MAC PDU assembly are first buffer status reports. "The device cancels the first buffer status report" may be understood as "the device cancels all first buffer status reports".

In some embodiments, the medium access control protocol data unit includes a buffer status that exists when an event triggers the first buffer status report. To be specific, when the assembled MAC PDU is sent, and the MAC PDU includes at least one buffer status report, if the MAC PDU includes the buffer status that exists when the event triggers the first buffer status report, it is considered that the condition for canceling the first buffer status report is satisfied. In this case, the device cancels the triggered first buffer status report. If a triggered buffer status report or scheduling request exists currently, the MAC PDU is assembled to include a buffer status report, and the buffer status report includes a latest buffer status at a current assembly time, that is, a buffer status up to the last event that triggers a buffer status report prior to the MAC PDU assembly, that is, the buffer status that exists when the event triggers the first buffer status report. Therefore, it may be considered that the first buffer status report is a buffer status report triggered prior to the MAC PDU assembly. It should be noted that, the quantity of first buffer status reports may be one or more. To be specific, when the MAC PDU includes the buffer status that exists when the event triggers the first buffer status report, "the device cancels the first buffer status report" may be understood as "the device cancels all first buffer status reports".

Figure 16:
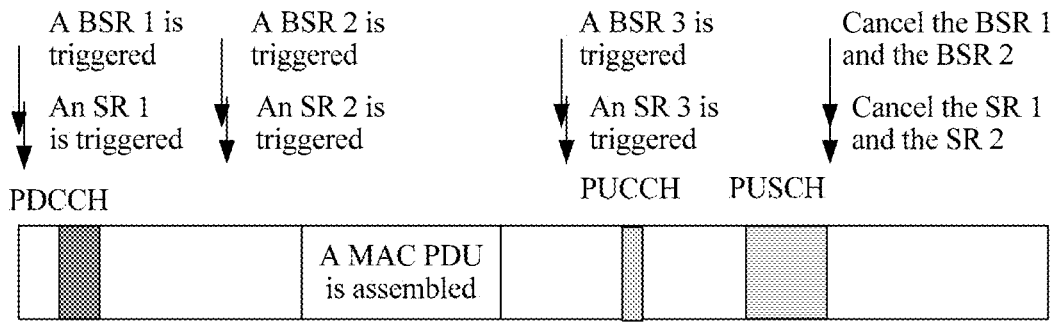
FIG. 16 is a schematic diagram of a cancellation method according to an embodiment of the present application.

With reference to accompanying drawings, the following describes a scheduling request cancellation method according to an embodiment of the present application. For example, refer to FIG. 16. Before a MAC PDU is assembled, an event 1 triggers a buffer status report BSR 1 at a time 1, which corresponds to a buffer status 1, and a scheduling request SR 1 is triggered. After the time 1 and before the MAC PDU is assembled, an event 2 triggers a buffer status report BSR 2 at a time 2, which corresponds to a buffer status 2, and a scheduling request SR 2 is triggered. After the MAC PDU is assembled, because a triggered buffer status report exists currently, the MAC PDU may include a buffer status report, and the buffer status report includes a buffer status up to the last event that triggers a buffer status report, that is, the buffer status 2. In this case, the SR 1 and the SR 2 are not canceled, but the SR 1 and the SR 2 are canceled after the MAC PDU is sent.

In addition, after the MAC PDU is assembled and before the MAC PDU is sent, an event 3 triggers a buffer status report BSR 3 at a time 3, which corresponds to a buffer status 3, and a scheduling request SR 3 is triggered. In this case, after the MAC PDU is assembled, the MAC PDU may include a buffer status report, and the buffer status report includes a buffer status up to the last event that triggers a buffer status report prior to the MAC PDU assembly, that is, the buffer status 2, instead of the buffer status 3 up to the last event that triggers a buffer status report. If the foregoing conditions are satisfied, the scheduling requests triggered before the MAC PDU is assembled are canceled, that is, the scheduling request SR 1 and the scheduling request SR 2 are canceled, but the scheduling request SR 3 triggered after the MAC PDU assembly is not canceled. Alternatively, if the MAC PDU includes buffer statuses at times of triggering some buffer status reports, scheduling requests triggered by the buffer status reports are canceled. For example, the MAC PDU includes the buffer status 1 and the buffer status 2 corresponding to the event 1 and the event 2. Therefore, the scheduling request SR 1 triggered by the buffer status report BSR 1 and the scheduling request SR 2 triggered by the buffer status report BSR 2 are canceled. However, the MAC PDU does not include the buffer status 3 corresponding to the event 3. Therefore, the scheduling request SR 3 triggered by the buffer status report BSR 3 is not canceled.

With reference to accompanying drawings, the following describes a buffer status report cancellation method according to an embodiment of the present application. For example, refer to FIG. 16. Before a MAC PDU is assembled, an event 1 triggers a buffer status report BSR 1 at a time 1, which corresponds to a buffer status 1, and a scheduling request SR 1 is triggered. After the time 1 and before the MAC PDU is assembled, an event 2 triggers a buffer status report BSR 2 at a time 2, which corresponds to a buffer status 2, and a scheduling request SR 2 is triggered. After the MAC PDU is assembled, because a triggered buffer status report exists currently, the MAC PDU may include a buffer status report. In this case, the BSR 1 and the BSR 2 are not canceled, but the BSR 1 and the BSR 2 are canceled after the MAC PDU is sent.

In addition, after the MAC PDU is assembled and before the MAC PDU is sent, an event 3 triggers a buffer status report BSR 3 at a time 3, which corresponds to a buffer status 3, and a scheduling request SR 3 is triggered. In this case, after the MAC PDU is assembled, the MAC PDU may include a buffer status report. In this case, not all triggered buffer status reports are canceled, but buffer status reports that are triggered prior to the MAC PDU assembly are canceled. To be specific, the buffer status report BSR 1 and the buffer status report BSR 2 are canceled, but the buffer status report BSR 3 triggered after the MAC PDU assembly is not canceled. Alternatively, if the MAC PDU includes buffer statuses at times of triggering some buffer status reports, the buffer status reports are canceled. For example, the MAC PDU includes the buffer status 1 and the buffer status 2 corresponding to the event 1 and the event 2. Therefore, the buffer status report BSR 1 and the buffer status report BSR 2 are canceled. However, the MAC PDU does not include the buffer status 3 corresponding to the event 3. Therefore, the buffer status report BSR 3 is not canceled.

According to the method in this embodiment of the present application, it can be ensured that a scheduling request is sent to a base station earlier. To be specific, the base station learns earlier that user equipment has data to be transmitted, so that the base station can allocate an uplink resource earlier to the user equipment for transmitting uplink data. Therefore, a latency of the uplink data of the user equipment is reduced.

Methods of embodiments of the present application are described in detail above. A person skilled in the art should be easily aware that the algorithm steps in the examples described with reference to the embodiments disclosed in this specification can be implemented in a form of hardware or a combination of hardware and computer software in this application. Whether a function is implemented by hardware or in a manner of driving hardware by computer software depends on a particular application and a design constraint of the technical solution. A person skilled in the art may use different methods to implement the described functions for each particular application, but it should not be considered that the implementation goes beyond the scope of this application.

In embodiments of this application, functional module division may be performed on the device based on the foregoing examples in the method. For example, various functional modules may be divided based on various corresponding functions, or two or more functions may be integrated into one processing module. The integrated module may be implemented in a form of hardware, or may be implemented in a form of a functional module of software. It should be noted that module division in the embodiments of this application is an example and is merely logical function division. During actual implementation, there may be another division manner.

Figure 17:
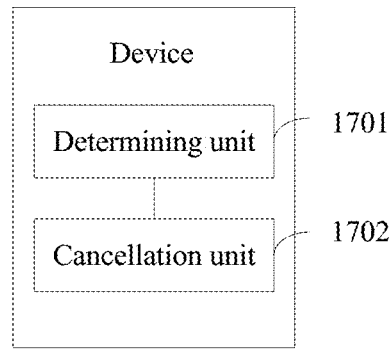
FIG. 17 is a structural block diagram of a device according to an embodiment of the present application.

When various functional modules are divided based on various corresponding functions, an embodiment of the present application provides a communications device, where the communications device may be a device used in this embodiment of the present application. When various functional modules are divided based on various corresponding functions, FIG. 17 is a possible schematic structural diagram of the communications device. As shown in FIG. 17, the device includes a determining unit 1701 and a cancellation unit 1702.

The determining unit 1701 is configured to support the device in performing step 1401 in the foregoing embodiment, and/or is configured to support the device in performing step 1501 in the foregoing embodiment, and/or is used in other processes of the technology described in this specification.

The cancellation unit 1702 is configured to support the device in performing step 1402 in the foregoing embodiment, and/or is configured to support the device in performing step 1502 in the foregoing embodiment, and/or is used in other processes of the technology described in this specification.

It should be noted that all related content of the steps in the method embodiments can be cited to the descriptions of functions of the corresponding functional modules, and details are not described again herein.

Figure 18:
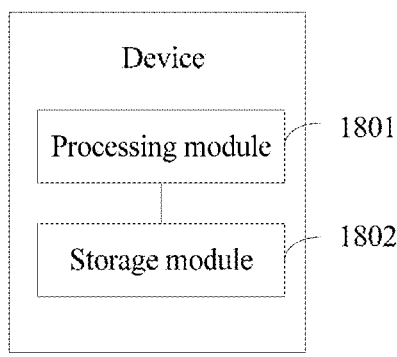
FIG. 18 is another structural block diagram of a device according to an embodiment of the present application.

For example, when an integrated unit is used, a schematic structural diagram of a device according to an embodiment of the present application is shown in FIG. 18. In FIG. 18, the device includes a processing module 1801. The processing module 1801 is configured to control and manage actions of the device, for example, perform a step performed by the determining unit 1701, and/or perform a step performed by the cancellation unit 1702, and/or configured to perform other processes of the technology described in this specification. As shown in FIG. 18, the device may further include a storage module 1802, where the storage module 1802 is configured to store program code and data of the device.

Figure 19:
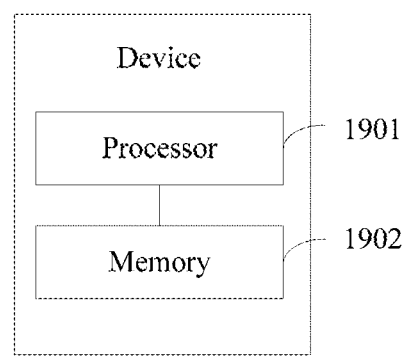
FIG. 19 is another structural block diagram of a device according to an embodiment of the present application.

For example, a schematic structural diagram of a device according to an embodiment of the present application is shown in FIG. 19. In FIG. 19, the device includes a processor 1901 and a memory 1902. The processing module 1801 is the processor 1901, for example, configured to perform the step performed by the determining unit 1701, and/or configured to perform other processes of the technology described in this specification. The storage module 1802 is the memory 1902, and is configured to store program code and data.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on requirements, that is, an internal structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and may be other division during actual implementation. For example, a plurality of units or components may be combined or integrated into another apparatus, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, in other words, may be located in one place, or may be distributed in a plurality of different places. Some or all of the units may be selected based on actual requirements to achieve objectives of solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, technical solutions in embodiments of this application may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely exemplary embodiments of this application, but are not intended to limit the protection scope of this application. Any variation or replacement within the technical scope disclosed in this application may fall within the protection scope of this application.

What is claimed is:

1. A scheduling request cancellation method, comprising:
   assembling, by a device, a medium access control protocol data unit (MAC PDU), wherein the MAC PDU comprises a first buffer status report (BSR), wherein the first BSR comprises a buffer status up to a last event that triggered a BSR prior to assembly of the MAC PDU;
   sending, by the device, the MAC PDU; and
   canceling, by the device, in response to the sending of the MAC PDU, a scheduling request triggered prior to assembly of the MAC PDU;
   wherein a scheduling request triggered after assembly of the MAC PDU is retained.

2. The method according to claim 1, wherein the method comprises:
   canceling, in response to the sending of the MAC PDU, all scheduling requests triggered prior to assembly of the MAC PDU.

3. The method according to claim 1, wherein before the scheduling request triggered prior to assembly of the MAC PDU is cancelled, the scheduling request triggered prior to assembly of the MAC PDU is in a pending state.

4. The method according to claim 1, further comprising:
   receiving, by the device on a physical downlink control channel resource, downlink scheduling information from a network device, wherein the downlink scheduling information indicates an uplink grant;
   wherein the MAC PDU is sent by the device by using the uplink grant.

5. The method according to claim 1, further comprising:
   stopping, by the device in response to the sending of the MAC PDU, a scheduling request prohibit timer associated with the scheduling request triggered prior to assembly of the MAC PDU.

6. The method according to claim 1, further comprising:
   stopping, by the device in response to the sending of the MAC PDU, scheduling request prohibit timers associated with all scheduling requests triggered prior to assembly of the MAC PDU.

7. A device, comprising at least one processor and a non-transitory memory having processor-executable instructions stored thereon coupled to the at least one processor, the at least one processor being configured to execute the processor-executable instructions to facilitate:
   assembling a medium access control protocol data unit (MAC PDU), wherein the MAC PDU comprises a first buffer status report (BSR), wherein the first BSR comprises a buffer status up to a last event that triggered a BSR prior to assembly of the MAC PDU;
   sending the MAC PDU; and
   canceling, in response to the sending of the MAC PDU, a scheduling request triggered prior to assembly of the MAC PDU;
   wherein a scheduling request triggered after assembly of the MAC PDU is retained.

8. The device according to claim 7, wherein the at least one processor is further configured to execute the processor-executable instructions to facilitate:
   canceling all scheduling requests triggered prior to assembly of the MAC PDU.

9. The device according to claim 7, wherein before the scheduling request triggered prior to assembly of the MAC PDU is cancelled, the scheduling request triggered prior to assembly of the MAC PDU is in a pending state.

10. The device according to claim 7, wherein the at least one processor is further configured to execute the processor-executable instructions to facilitate:

receiving, on a physical downlink control channel resource, downlink scheduling information from a network device, wherein the downlink scheduling information indicates an uplink grant;

wherein sending the MAC PDU comprises sending the MAC PDU by using the uplink grant.

11. The device according to claim 7, wherein the at least one processor is further configured to execute the processor-executable instructions to facilitate:

stopping, in response to the sending of the MAC PDU, a scheduling request prohibit timer associated with the scheduling request triggered prior to assembly of the MAC PDU.

12. The device according to claim 7, wherein the at least one processor is configured to execute the processor-executable instructions to facilitate:

stopping, in response to the sending of the MAC PDU, scheduling request prohibit timers associated with all scheduling requests triggered prior to assembly of the MAC PDU.

13. A non-transitory computer-readable storage medium, comprising processor-executable instructions, wherein the processor-executable instructions, when executed, facilitate:

assembling a medium access control protocol data unit (MAC PDU), wherein the MAC PDU comprises a first buffer status report (BSR), wherein the first BSR comprises a buffer status up to a last event that triggered a BSR prior to assembly of the MAC PDU;

sending the MAC PDU; and canceling, in response to the sending of the MAC PDU, a scheduling request triggered prior to assembly of the MAC PDU;

wherein a scheduling request triggered after assembly of the MAC PDU is retained.

14. The non-transitory computer-readable storage medium according to claim 13, wherein the processor-executable instructions, when executed, further facilitate:

canceling all scheduling requests triggered prior to assembly of the MAC PDU.

15. The non-transitory computer-readable storage medium according to claim 13, wherein the processor-executable instructions, when executed, further facilitate:

receiving, on a physical downlink control channel resource, downlink scheduling information from a network device, wherein the downlink scheduling information indicates an uplink grant; and wherein sending the MAC PDU comprises sending the MAC PDU by using the uplink grant.

16. The non-transitory computer-readable storage medium according to claim 13, wherein the processor-executable instructions, when executed, further facilitate:

stopping in response to the sending of the MAC PDU, a scheduling request prohibit timer associated with the scheduling request triggered prior to assembly of the MAC PDU.

17. The non-transitory computer-readable storage medium according to claim 13, wherein the processor-executable instructions, when executed, further facilitate:

stopping, in response to the sending of the MAC PDU, scheduling request prohibit timers associated with all scheduling requests triggered prior to assembly of the MAC PDU.

* * * * *